US008233191B2

(12) United States Patent
Tsuchiya

(10) Patent No.: US 8,233,191 B2
(45) Date of Patent: Jul. 31, 2012

(54) COLOR PRODUCTION WITH HIGH CHROMA USING COMPLEMENTARY COLOR MATERIAL WITH DIFFERENT HUE AT LOW LIGHTNESS PORTION

(75) Inventor: Okinori Tsuchiya, Yokohami (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/825,246

(22) Filed: Jun. 28, 2010

(65) Prior Publication Data

US 2010/0265527 A1 Oct. 21, 2010

Related U.S. Application Data

(62) Division of application No. 11/752,510, filed on May 23, 2007, now Pat. No. 7,773,258.

(30) Foreign Application Priority Data

May 29, 2006 (JP) ................................. 2006-148731

(51) Int. Cl.
H04N 1/50 (2006.01)
H04N 1/56 (2006.01)
H04N 1/60 (2006.01)

(52) U.S. Cl. ......... 358/1.9; 358/515; 358/519; 358/520; 358/523

(58) Field of Classification Search .................... 358/1.9, 358/515, 518–523; 382/162, 167; 345/589, 345/591
See application file for complete search history.

(56) References Cited

U.S. PATENT DOCUMENTS

| | | | |
|---|---|---|---|
| 4,837,613 A * | 6/1989 | Paxton et al. | 358/515 |
| 5,870,530 A | 2/1999 | Balasubramania | |
| 6,980,326 B2 | 12/2005 | Tsuchiya et al. | |
| 7,009,734 B2 | 3/2006 | Suwa et al. | |
| 7,012,714 B2 | 3/2006 | Higashikata et al. | |
| 7,016,530 B2 | 3/2006 | Saito et al. | |
| 7,136,523 B2 | 11/2006 | Fukao et al. | |
| 7,229,166 B2 | 6/2007 | Tomioka et al. | |
| 7,463,384 B2 * | 12/2008 | Tsuchiya et al. | 358/1.9 |
| 7,466,448 B2 | 12/2008 | Yamamoto et al. | |

(Continued)

FOREIGN PATENT DOCUMENTS

JP 10-112809 4/1998

(Continued)

OTHER PUBLICATIONS

Adobe Photoshop 4.0 User Guide, 1996, pp. 111-113 and 218-220.*

(Continued)

Primary Examiner — Scott A Rogers
(74) Attorney, Agent, or Firm — Fitzpatrick, Cella, Harper & Scinto

(57) ABSTRACT

Color production with high chroma in a low lightness portion is realized by using an appropriate complementary color ink to a particular color ink reproducing the low lightness portion. More specially the device secondary color G-K is reproduced with ink of the pure color component composed of the color mixture of the particular color G ink and the basic color Y ink to tone the particular color G ink. In addition, as complementary color components, the particular color R ink and K ink are used. Thereby, the reproduction line is substantially linear from the device secondary color G point to the device K point. In color reproduction at the dark portion of the color on the G-K line, sufficient chroma can be obtained.

16 Claims, 33 Drawing Sheets

U.S. PATENT DOCUMENTS

| | | |
|---|---|---|
| 7,583,407 B2 | 9/2009 | Imai |
| 7,641,310 B2 * | 1/2010 | Tsuchiya ................. 347/43 |
| 2002/0154326 A1 | 10/2002 | Tsuchiya et al. |
| 2003/0234947 A1 | 12/2003 | Tsuchiya |
| 2005/0052670 A1 | 3/2005 | Nishikawa |
| 2005/0052671 A1 | 3/2005 | Nishikawa |
| 2006/0061785 A1 | 3/2006 | Nagoshi et al. |
| 2006/0245016 A1 | 11/2006 | Fukao et al. |
| 2007/0046960 A1 | 3/2007 | Imai |
| 2007/0273738 A1 | 11/2007 | Tsuchiya |

FOREIGN PATENT DOCUMENTS

| | | |
|---|---|---|
| JP | 2002010096 | 1/2002 |
| JP | 2002033930 | 1/2002 |
| JP | 2003011432 | 1/2003 |
| JP | 2005-059360 | 3/2005 |
| JP | 2005-059361 | 3/2005 |
| JP | 2005-205812 | 8/2005 |
| JP | 2005-217987 | 8/2006 |

OTHER PUBLICATIONS

Adobe Photoshop 6.0 User Guide, Sep. 2000, Chapter 3-4 and 14.*

* cited by examiner

COLOR PRODUCTION WITH HIGH CHROMA USING COMPLEMENTARY COLOR MATERIAL WITH DIFFERENT HUE AT LOW LIGHTNESS PORTION

This application is a divisional of U.S. patent application Ser. No. 11/752,510, filed May 23, 2007, the contents of which are incorporated by reference herein.

BACKGROUND OF THE INVENTION

1. Field of the Invention

The present invention relates to an image processing apparatus, a printing apparatus and an image processing method, and particularly to color separation in which a particular color recording material is used at a low lightness portion in a color reproduction range by a printing apparatus.

2. Description of the Related Art

An image forming apparatus that forms image information (including characters, symbols and the like) on a print medium is known as a printer, a copier, and a facsimile machine or an output device of information processed by a computer or a word processor. Such an image processing apparatus performs the printing based upon image information with use of a printing mechanism, on the print medium such as papers or plastic thin sheets (OHP sheet). Examples representative of these printing systems include an ink jet system, a wire dot system, a thermo-sensitive system, a thermal-transfer system, an electro-photographic system using a laser beam and the like, and the like.

Among these printing systems described above, the ink jet system ejects ink from a print head in the form of drop to be landed to the print medium for forming dots to generate an image thereon. An ink jet printer using this system is widely used recently as an output device for an information processing equipment such as a computer or the like.

In the ink jet printer, dyes or pigments are used as coloring materials contained in the ink as recording materials. Basic colors of cyan (C), magenta (M) and yellow (Y) as three primary colors of the subtractive color mixing are used as ink colors by the coloring materials. Also, a system using four colors containing further black (K) is generally used. This system can realize reduction in an ink applying amount to the print medium or the density improvement, by further using black. Further, in a system for a high image quality of a photographic image, the ink of light cyan (LC) and light magenta (LM), which have lower concentration than that of cyan and magenta inks, may be used as quasi-basic color ink in addition to the ink of the above four colors. This allows the image quality improvement such as reducing a granular feeling on a highlight part of the printed image. Also, print systems further using ink of gray (Gry) and light gray (light Gry) are known.

In the meantime, a demand for higher image quality is recently increasing with wide use of a color printer. However, the above stated basic colors and quasi-basic colors have the limitation in reproducing color and it is hard to reproduce a relative bright color therewith. Therefore, particular colors such as red (R), orange (O), green (G), blue (B), violet (V) and the like in addition to the basic colors and the quasi-basic colors are used to realize color reproduction with high chroma which is impossible to be reproduced only with the basic color and the quasi-basic color.

Japanese Patent Laid-Open No. 10-112809 (1998) discloses that with regard to basic color recording materials produced by color separation, color separation in a system of using particular colors is made by exchanging two of the basic colors for the particular color obtained by mixing the two basic color recording materials. More specifically, Japanese Patent Laid-Open No. 10-112809 discloses the color separation for broadening a color reproduction region by using particular color O ink in addition to inks of the basic colors M and Y, with regard to the hue between respective hues of M and Y as shown in FIG. 1.

Further, recently, color printers with high photographic image quality oriented for photographers or high level amateurs of photos, among color printers using particular colors, have been widely used. In such printer with high photographic image quality, a delicate color reproduction is required even in a gamut to which attention is not paid in a conventional color printer. One example is a delicate expression of a gradation at a dark portion (low lightness portion) in a color reproduction region by a printer. For realizing the delicate gradation expression at the dark portion, the chroma in the dark portion of the color reproduction region by the printer becomes important.

FIG. 2 is a diagram showing a color reproduction region by a printer on a $C^*L^*$ plane. For example, a color reproduction region in a case where the chroma at the dark portion of printer color reproduction region is low, has an out line that is shown in color reproduction line a1, b1, b2 or b3. On the other hand, a color reproduction region in a case where the chroma at the dark portion of printer color reproduction region is high is shown in color reproduction line b4 or b5.

FIGS. 3 and 4 show views showing how a difference in chroma at the dark portion of color reproduction region influences an image quality and show a photographic image of green ivy. FIGS. 3 and 4 correspond to respective printing based on the same data of a photographic image, in a case of using a color reproduction region where the chroma at the dark portion is low as the color reproduction line b1 shown in FIG. 2 and in a case of using a color reproduction region where the chroma at the dark portion is high as the color reproduction line b4 shown in FIG. 2. The respective printed images are color images in which the lightness is nearly equal and the chroma is different. In the present specification, for explaining the image with a binary image of white and black, FIGS. 3 and 4 are expressed as binary images of white and black which are subjected to a process of extracting the chroma $C^*$ only.

As described above, FIG. 3 shows an image of green ivy by the color reproduction region where the chroma at the dark portion is low, and FIG. 4 shows an image of green ivy by the color reproduction region where the chroma at the dark portion is high. In these figures, the portion shown as black is a low chrome region and the portion shown as white is a high chrome region. Here, a comparison of an image (attention part P1) by the color reproduction region in which the chroma at the dark portion is low with an image (attention part P2) by the color reproduction region where the chrome at the dark portion is high is as follows. In the attention part P1 in FIG. 3, the shade portion of an ivy leaf becomes black wholly and the detail can not be determined. On the other hand, in the attention part P2 in FIG. 4, even the shade portion of an ivy leaf is expressed in white and with high chroma and the detail can be determined. Here, the image of the green ivy is exemplified, but when an image like a leaf of an acicular tree is used, the number of leaves which can be determined changes depending on the chrome at the dark portion. In addition, the above result is applied to not only an image in green but also an image of hair of humans or animals in a different hue.

As described above, by performing the color reproduction with higher chrome even at the dark portion in the printer gamut, more delicate color reproduction (gradation value) can be made.

As the conventional art where attention is paid even to the color reproduction at the dark portion, there is known a color separation with respect to basic colors which is disclosed in Japanese Patent Laid-Open No. 2002-10096. Japanese Patent Laid-Open No. 2002-10096 discloses the art which sets the amount of black ink so that the maximum gamut is obtained within the ejection amount (coverage) limit, in order to broaden the gamut of the color reproduction region at the dark portion in a printer of four colors of C, M, Y and K.

In addition, as the conventional arts where attention is paid to color reproduction at the dark portion in a system using a particular color, there are known arts disclosed in Japanese Patent Laid-Open Nos. 2003-11432, 2005-205812, and 2005-217987. Japanese Patent Laid-Open Nos. 2003-11432, 2005-205812, and 2005-217987 disclose a system using particular color (G) ink realizing high lightness and high chrome, as shown in FIG. 5. More specifically, when reproducing a secondary color, a particular color is positively used in the high lightness region where reproduction region broadening is effectively made by the particular color. Then, since use of color mixture of basic color inks may broaden the color reproduction region more than use of the particular color at the low lightness portion (dark portion), the particular color ink is less used and the chroma is expressed with color mixing of the basic colors. FIG. 6 is a diagram showing one example of this color separation. As shown in the figure, according to the color separation disclosed by Japanese Patent Laid-Open No. 2003-11432 or the like, the color reproduction in the light region is made using the particular color (G) ink in FIG. 5 and the color reproduction in the dark region is made using C ink and Y ink mainly.

Further, Japanese Patent Laid-Open Nos. 2005-059361 and 2005-059360 describe color separation that uses a particular color as a complementary color component for a basic color at a low lightness portion of the hue opposite the hue of the particular color so as to broaden a color reproduction region at a dark portion, in a system using the particular color for realizing high lightness and high chroma. FIG. 7 is a diagram showing one example of this color separation. As shown in the figure, the color reproduction in a primary color Cyan-Black having the hue opposite the hue of the particular color Red is realized by using the particular color R ink as a complementary color component for basic color C ink. In addition, these patent documents, as shown in FIG. 7, further describe that a secondary color Red-Black is reproduced using the particular color R ink, as well as basic color C ink and quasi-basic color K ink as complementary color components.

The color separation of conventional arts described above is, however, not sufficient in view of increasing the chroma at a low lightness portion.

Japanese Patent Laid-Open No. 10-112809 does not disclose any color separation that realizes broadening the reproduction region at the dark portion in a color reproduction region of a printer. Japanese Patent Laid-Open No. 2002-10096 discloses the color separation where attention is paid to broadening the reproduction region at the dark portion, but uses only basic colors without using particular colors. Therefore, an improvement of sufficient chroma at the dark portion can not be expected. In addition, Japanese Patent Laid-Open Nos. 2003-11432, 2005-205812 and 2005-217987 basically relate to the color separation in less use of the particular color at the dark portion. Therefore, likewise, an improvement of sufficient chroma at the dark portion can not be expected.

On the other hand, Japanese Patent Laid-Open Nos. 2005-059361 and 2005-059360 disclose that as described above, the color reproduction at the back portion of secondary color Red-Black is made using particular color R ink having the hue similar to that of the secondary color and basic colors of M and Y ink, and also using K and C ink as complementary colors. According to these color separations, it is possible to broaden the color reproduction region at the dark portion (low lightness portion).

However, since the color separation uses the basic color and the quasi-basic color as the complementary color components, there is a case where these complementary colors do not become idealized complementary colors for the particular color in terms of a reflection spectrum. As a result, the color reproduction where the lightness is sufficiently lowered and at the same time, reduction of the chroma is prevented may not be realized. Thus, it may not be possible to realize high chroma at the dark portion.

SUMMARY OF THE INVENTION

An object of the present invention is to provide an image processing apparatus, a printing apparatus and an image processing method which are capable of realizing color reproduction with high chroma at a low lightness portion by using a recording material of an appropriate complementary color for a particular color recording material for reproducing the low lightness portion.

In the first aspect of the present invention, there is provided an image processing apparatus that performs a color separation process for, as recording materials used for color reproduction, determining an amount of a particular color recording material expressing a color having a hue different from respective hues expressed by each of basic color recording materials corresponding to three primary colors, said apparatus comprising: color separation means for determining an amount of each of a first and a second particular color recording materials so that, among colors to be reproduced by using the first particular color recording material, a color having a lightness lower than a lightness of a color having a maximum chroma is reproduced by using the second particular color recording material as well as the first particular color recording material.

In the second aspect of the present invention, there is provided an image processing method of performing a color separation process for, as recording materials used for color reproduction, determining an amount of a particular color recording material expressing a color having a hue different from respective hues expressed by each of basic color recording materials corresponding to three primary colors, said method comprising: a color separation step for determining an amount of each of a first and a second particular color recording materials so that, among colors to be reproduced by using the first particular color recording material, a color having a lightness lower than lightness of a color having a maximum chroma is reproduced by using the second particular color recording material as well as the first particular color recording material.

In the third aspect of the present invention, there is provided a printing apparatus that performs printing by using respective basic color recording materials corresponding to three primary colors and particular color recording materials which express different hues from respective hues expressed with the basic color recording materials, wherein in a case of reproducing colors on a color reproduction line which extends from a color having a maximum chroma to a color of black and is expressed with a first particular color recording material, a second particular color recording material as well the first particular color recording material.

According to the above configuration, when reproducing a color in a low lightness by using a first particular color recording material, a second particular color recording material is used as a complementary color, the lightness can be effectively lowered and the lowering of the chroma can be prevented. In consequence, even at a dark portion in a color reproduction region reproduced by the particular color recording material, the color reproduction with high chrome can be made.

Further features of the present invention will become apparent from the following description of exemplary embodiments (with reference to the attached drawings).

DESCRIPTION OF THE EMBODIMENTS

Embodiments of the present invention will be hereinafter described with reference to the accompanying drawings.
Definition of Terms
First, terms used in the present specification will be defined as follows.
(Primary Color and Secondary Color)

A color corresponding to each of three primary colors of color signals used by a device such as a display or a printer is called a device primary color and a color formed by mixing any two colors among the three device primary colors is called a device secondary color. These are a narrow defined primary color and a narrow defined secondary color respectively as explained below.

In a display coloring by additive color mixing, a color of each R, G and B is a device primary color and a color of each C (=G+B), M (=R+B), and Y (=R+G) is a device secondary color. Among colors specified by an input color signal (R, G or B) to a color correction processing section 101 in an image processing arrangement to be described later in FIG. 17, a color of each R, G or B is a device primary color and a color of each C, M or Y is a device secondary color.

In addition, in a printer coloring by a subtractive color mixing, a color of each C, M and Y is a device primary color and a color of each R (=M+Y), G (=C+Y), and B (=C+M) is a device secondary color. Among colors specified by an input color signal (R, G or B) to a color conversion processing section 102 to be described later in FIG. 17, a color of each C, M and Y is a device primary color and a color of R, G and B is a device secondary color.

On the other hand, in a broad sense, an elementary color which a device has, that is, a color which the device can reproduce by a single color printing is a primary color and a mixed color formed by mixing any two colors among these basic colors is a secondary color.

In the present specification, for avoiding mix-up of the primary colors in a narrow definition and in a broad definition, and of the secondary colors in a narrow definition and in a broad definition, the primary and secondary colors in a narrow definition are called device primary and secondary colors respectively, and the primary and secondary colors in a broad definition are called simply primary and secondary colors respectively.

Figure 18:
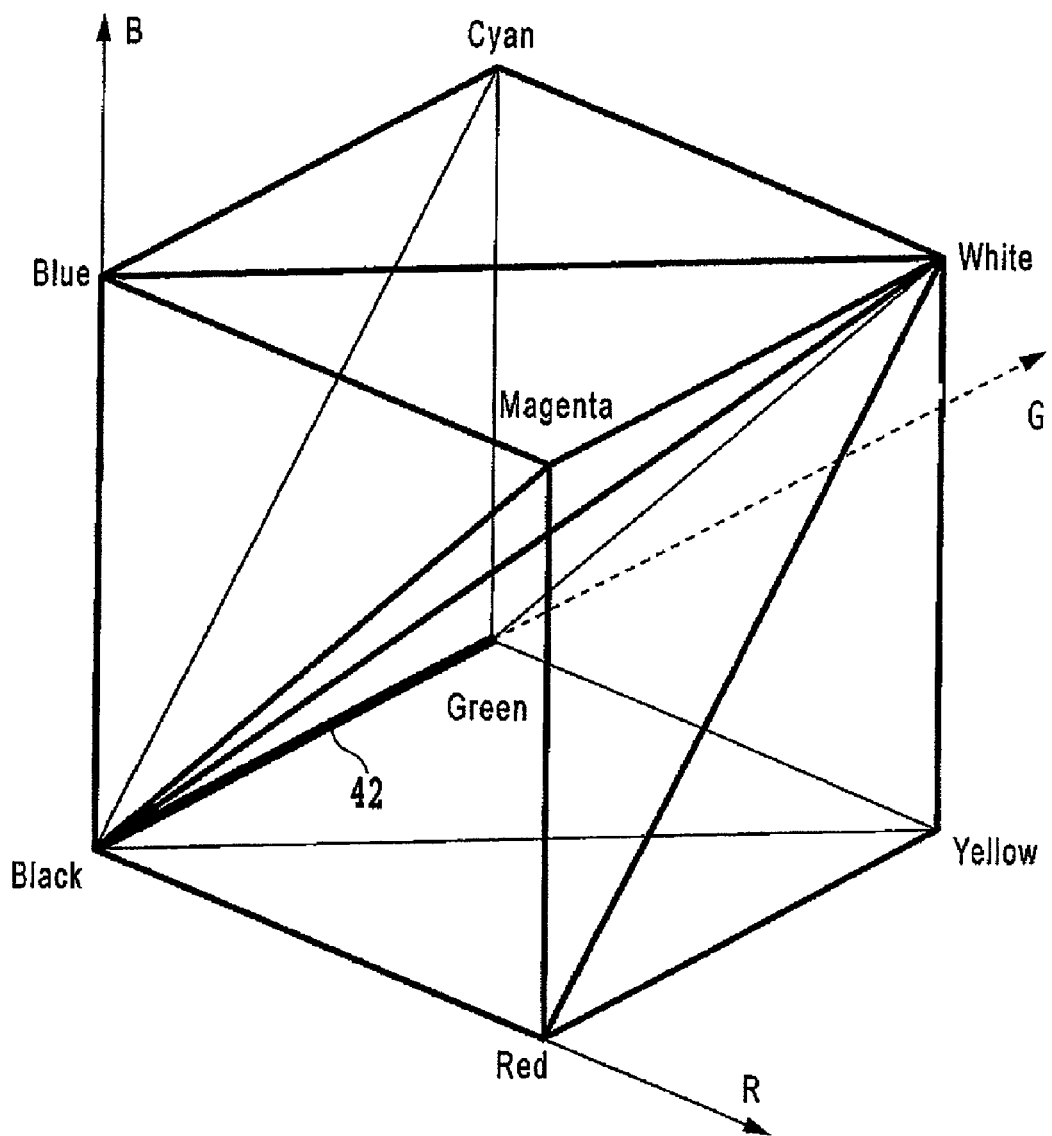
FIG. 18 is a diagram showing a cube of a color separation table in a device RGB color space of a printer.

Further, in the present specification describing color separation processing for generating an output data of ink in a printer, colors specified by color signals defining points (including lattice points) on a W-C-K line, a W-M-K line and a W-Y-K line in FIG. 18 on a color separation table can be defined to be device primary colors. Likewise, colors specified by color signals of points (including lattice points) on a W-R-K line, a W-G-K line, and a W-B-K line can be defined to be device secondary colors.

(Basic Color Ink (Recording Material) and Quasi-basic Color Ink (Recording Material))

In the present specification, ink of three colors of C, M and Y as three basic colors of a subtractive color mixing is called basic color ink, and ink of LC, LM, Gry, LGry, and K, which is the same kind of color as these or an achromatic color, is called quasi-basic color ink.

(Color Space in Accordance with Visual Feature of Humans)

In the present specification, for comparing the color reproduction regions or specifying the hue, a CIE-$L^*$ $a^*$ $b^*$ space is used as a color space in accordance with the visual feature of humans, but is not limited to this space. For example, an arbitrary color space such as XYZ, $L^*$ $u^*$ $v^*$, a Munsell color system, Yxy, and $L^*$ $C^*$ $h^*$ may be used. A portion defined by a CIE-$L^*$ $a^*$ $b^*$ color space described in the present specification may be defined by using the above-mentioned color space other than the CIE-$L^*$ $a^*$ $b^*$ color space.

(Light Ink)

In an ink jet printer, for reducing a granular feeling due to dots at a highlight portion which is low in a dot filling ratio on a print medium, there is used ink which has the same kind of color as regular ink (dark ink) regularly used and which is low in coloring material concentration. Light cyan (LC) to cyan (C) and light magenta (LM) to magenta (M) are generally used, and light gray (LGry) to gray (Gry) may be used. With regard to an ink composition of each of dark ink and light ink, the coloring material concentration only may be different from each other, or the coloring material itself may be different from each other. In consequence, the dark ink and the light ink both belong to the same kind of color, but the color maybe slightly different from each other. Light ink may be called photo ink.

(Particular Color)

In the present specification, "particular color" denotes a color which has different hue from a hue of yellow, magenta or cyan as a basic color recording material, in a broad sense. In addition, in a narrow definition, in a CIE-$L^*$ $a^*$ $b^*$ color space, "particular color" denotes a color which can express a chroma higher than a color reproduction region expressed on a print medium by combination of two arbitrary recording materials among basic color recording materials of magenta, yellow and cyan, and which shows a hue angle within the color reproduction region expressed by combination of the above two arbitrary recording materials.

It is preferable to use a recording material as "particular color" in a narrow definition described above in a case of an application of the present invention, but a recording material as "particular color" in a broad sense may be used. In addition, in the present specification, an example of a particular color ink may include particular color G ink of the hue between Y and C, particular color B ink and particular color V ink between C and M, and particular color R ink or particular color O ink of the hue between M and Y.

(Ejection Amount)

In the present specification, "ejection amount" denotes an ink applying amount that is determined as an amount of a single color of ink applied to a unit area of a print medium. A total ejection amount denotes a sum of the ejection amounts of all ink kinds used in accordance with a color separation table. It should be noted that (ink) duty, (ink) applying amount, and (ink) coating amount are used in the same way.

The total ink ejection amount which can be accommodated by a print medium has the upper limit, and has a different value depending on an ink amount applied per unit area and unit time, ink properties and print medium properties. This upper limit has a tendency of becoming smaller, in general as the print resolution is higher, as an ink applying amount per unit time becomes larger because of high-speed printing, as permeability as the ink properties is lower, or as an ink accommodating layer as print medium properties is thinner.

(Color Mixture and Blending)

In the present specification, "color mixture" denotes a state where inks of plural colors are printed on a print medium by means of an area modulation system. For example, in a case of performing printing in which next ink is printed before the ink previously printed, which is of dye, dries up, the expression of this "color mixture" is appropriate. In contrast, in a case where the next ink is printed on the ink previously printed as in the case of a pigment ink, so that the previously printed ink is covered with the later printed ink, the expression of "layer" is appropriate. In the present specification, these expressions are selectively used in accordance with the content to be described.

In addition, in the present specification, "blended" ink denotes ink of a state where plural kinds of ink are blended in an ink drop state. This is the meaning similar to "color mixture" for the case of the above-mentioned dye ink system, but since a coloring material to be used is not limited to dye in the present specification, "color mixture" and "blending" ink are distinguished intentionally.

(Name of Color)

In the present specification, names of colors are used as follows and are selectively used in accordance with the contents to be described respectively.

White, W, and white denote a white color. Black, Bk, K and black denote a black color. Cyan and C denote cyan. Magenta and M denote magenta. Yellow, Y and yellow denote a yellow color. Red, R and red denoted a red color. Green, G and green denote a green color. Blue, B and blue denote a blue color. Orange, O and orange denote an orange color. Violet, V and violet denote a violet color. Light Cyan, LC, PC, light cyan, and photo cyan denote light cyan. Light Magenta, LM, PM, light magenta and photo magenta denote light magenta. Gray, Gry, and gray denote a gray color. Light Gray, Light Gry, LGry, light gray and photo gray denote a light gray color.

(Pure Color and Complementary Color)

In the present specification, a color having an effect of reducing at least one of chroma and lightness when that color is mixed to a predetermined color is called a complementary color and the predetermined color of which the chroma or the lightness is reduced is called a pure color. For example, such as a basic color C to a particular color R, a color which becomes a complementary color independently exists. However, such as both of a basic color M and a basic color Y to a basic color C, the complementary color may be a mixed color of plural colors. In the present specification, in a case where the mixed color of the plural colors thus becomes a complementary color in terms of an essential meaning, each color of the plural colors is also called a complementary color.

For example, the following examples show a relation of pure color and complementary color or complementary color and pure color: particular color R or particular color O, basic color M and basic color Y to basic color C; particular color G, basic color C and basic color Y to basic color M; and particular color B or particular color V, basic color C and basic color M to basic color Y.

Matter Concerning Color Engineering

Next, some matters concerning color engineering used in the present specification will be explained briefly.

(Coloring of Reflection Copy and Perception Mechanism)

Figure 8:
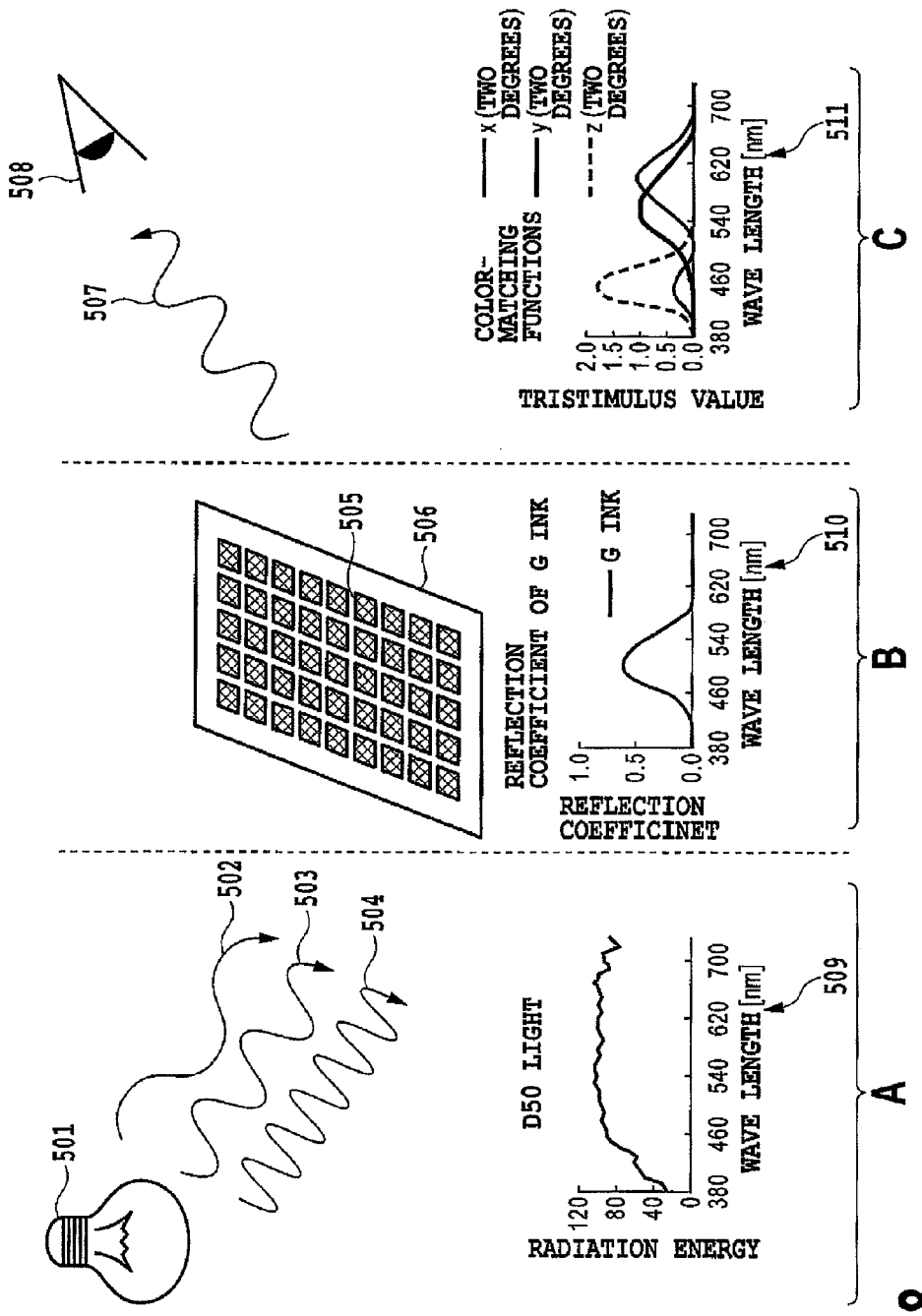
FIG. 8 is a diagram schematically explaining coloring of a reflection copy and the perception mechanism.

FIG. 8 is a schematic diagram for explaining a perception mechanism of colors in the reflection copy. Each of regions A, B and C shown in FIG. 8 corresponds to irradiation of light, absorption of light by a copy and reflection of a partial zone, and visual recognition of humans. Hereinafter, in a case of observing under a white color light the reflection copy on which a patch for measuring a green color is printed, the coloring and the perception mechanism will be explained.

Visible light (red color light) of long wavelength 502, visible light (green color light) of medium wave length 503 and visible light (blue color light) of short wave length 504 are radiated in a mixed state from a white color light source 501.

Light from a white color light source 501 enters onto an object patch 505 of the reflection copy 506, and light 502 of long wave length and light 504 of short wave length, which are part of the above light, are absorbed. On the other hand, light of medium wave length 503 which is not absorbed is reflected from the copy and reaches eyes of humans 508 as reflection light 507.

Figure 9:
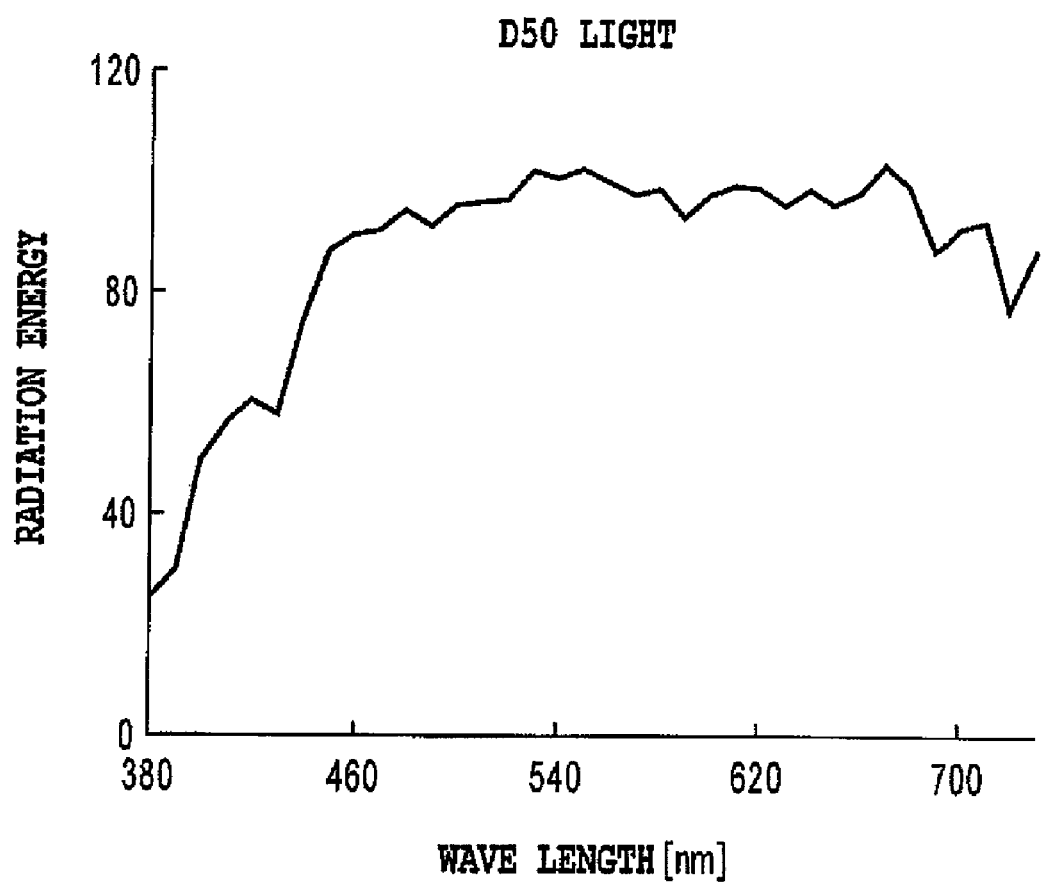
FIG. 9 is a diagram showing a spectrum of a white color light D50.
Figure 10:
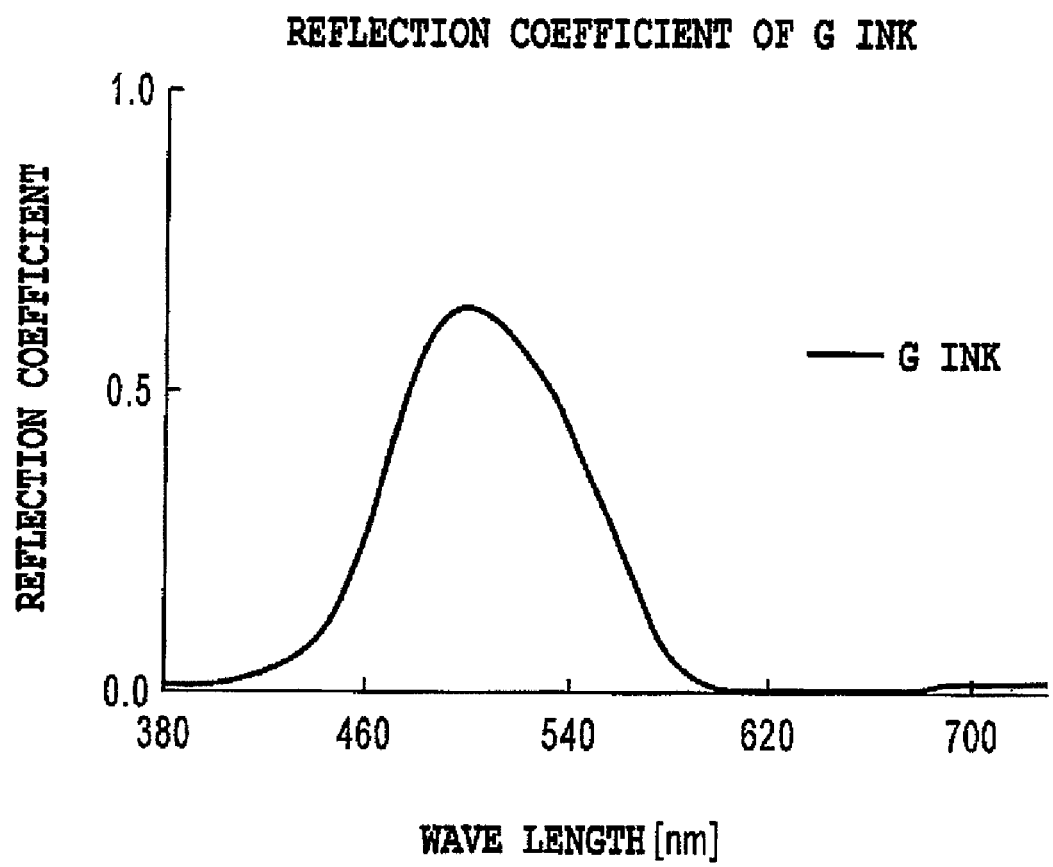
FIG. 10 is a diagram showing a spectrum of one example of G ink.

The white color light is radiated in the entire zone of the wave length from 380 nm to 730 nm that are perceived by the human eye, as shown in a graph 509 and FIG. 9 showing the detail of the graph 509. On the other hand, the reflective characteristics of the patch portion is formed as a band pass filter where a shortwave length and a long wave length are cut and a medium wave length is transmitted, as shown in a graph 510 and in FIG. 10 showing the detail of the graph 510. In consequence, with respect to the white color light 505, a short wave length 904 and a long wave length 902 are cut by the characteristics 510 of the band pass filter and a medium wave length (region of a green color) 907 only remains to reach eyes of humans 508.

Figure 11:
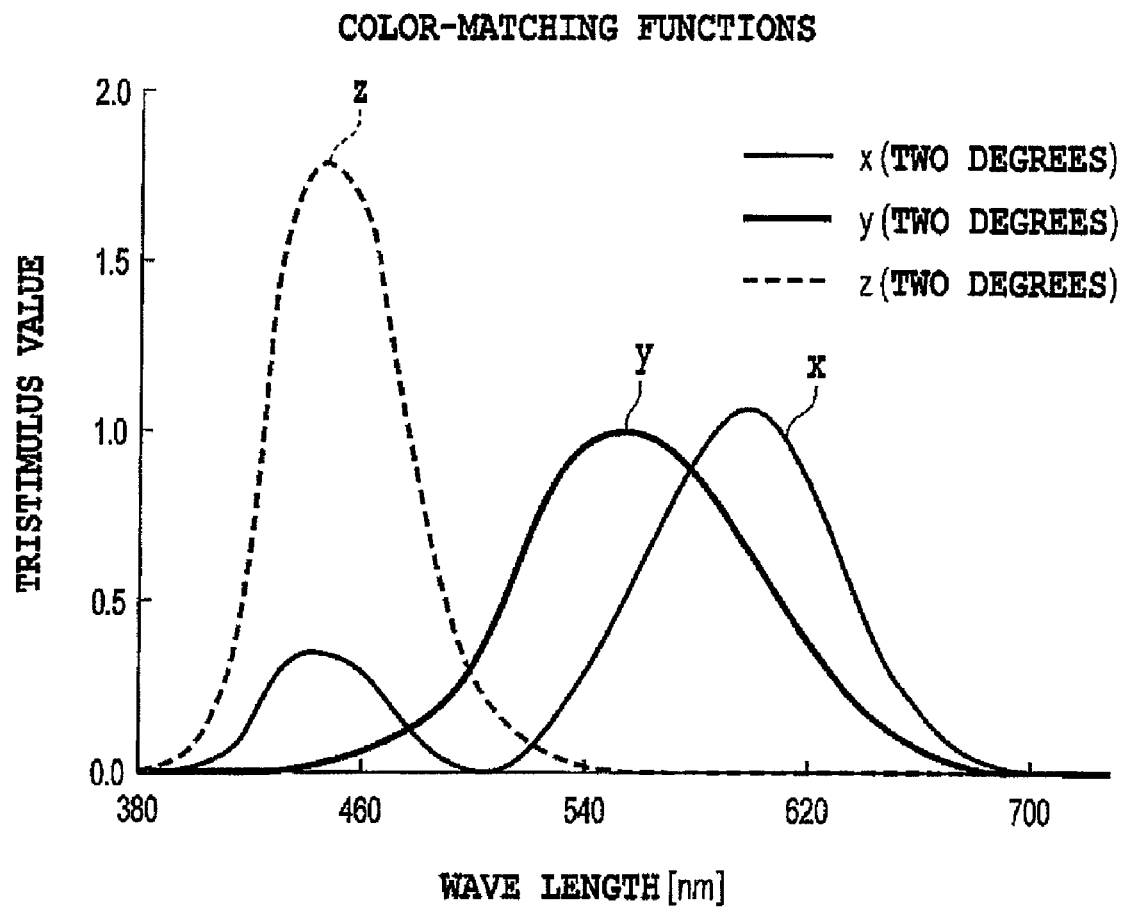
FIG. 11 is a diagram explaining color-matching functions.

The light which has entered onto the eyes of humans 508 is perceived according to color-matching functions having three kinds of different response characteristics which are shown in a graph 511 and FIG. 11 showing the detail of the graph 511. Light of the medium wave length 507 is, since it has a peak in the vicinity of 500 nm, not nearly perceived in a z color-matching function, but is strongly perceived in a y color-matching function and in an x color-matching function.

The processes of irradiation and reflection and recognition in these lights are represented according to the following formulas of formula 1, formula 2 and formula 3 by using an integration of a wave length λ.

[Formula 1]

$$X = 100 \frac{\int R(\lambda)P(\lambda)\bar{x}(\lambda)d\lambda}{\int P(\lambda)\bar{y}(\lambda)d\lambda} \quad \text{Formula 1}$$

$$Y = 100 \frac{\int R(\lambda)P(\lambda)\bar{y}(\lambda)d\lambda}{\int P(\lambda)\bar{y}(\lambda)d\lambda} \quad \text{Formula 2}$$

$$Z = 100 \frac{\int R(\lambda)P(\lambda)\bar{z}(\lambda)d\lambda}{\int P(\lambda)\bar{y}(\lambda)d\lambda} \quad \text{Formula 3}$$

In summary, an X value responds mainly to light of a red region, a Y value responds mainly to light of a green region and a Z value responds mainly to light of a blue region. In particular, the Y value shows lightness, too.

Further, a coordinate value (L*, a* and b*) modified to form a uniform color space where an Euclidean distance in a color space corresponds to a color difference is represented according to the following formulas of formula 5, formula 6 and formula 7 by using formula 4.

[Formula 2]

$$f\left(\frac{Z}{Z_n}\right) = \quad \text{Formula 4}$$

$$\begin{cases} \left(\frac{X}{X_n}\right)^{\frac{1}{3}} & 0.008856 < \left(\frac{X}{X_n}\right) \\ 7.787\left(\frac{X}{X_n}\right) + \frac{16}{116} & \left(\frac{X}{X_n}\right) \le 0.008856 \end{cases} (x \text{ is } X, Y, \text{ or } Z)$$

$$L^* = 116 f\left(\frac{Y}{Y_n}\right) - 16 \quad \text{Formula 5}$$

$$a^* = 500\left[f\left(\frac{X}{X_n}\right) - f\left(\frac{Y}{Y_n}\right)\right] \quad \text{Formula 6}$$

$$b^* = 200\left[f\left(\frac{Y}{Y_n}\right) - f\left(\frac{Z}{Z_n}\right)\right] \quad \text{Formula 7}$$

(Spectrum and Color Reproduction)

Figure 12:
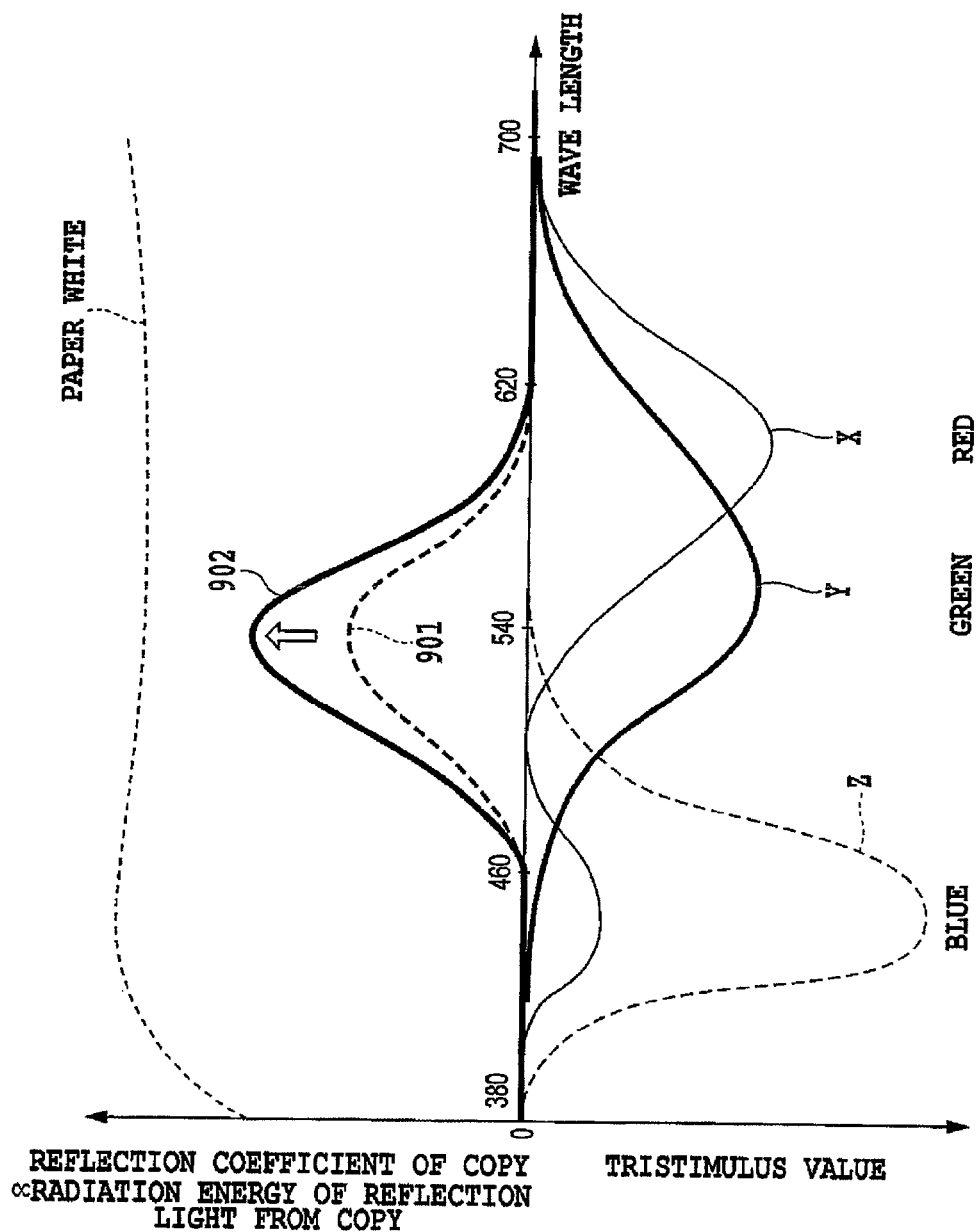
FIG. 12 is a diagram explaining a relation between spectrum and lightness.
Figure 13:
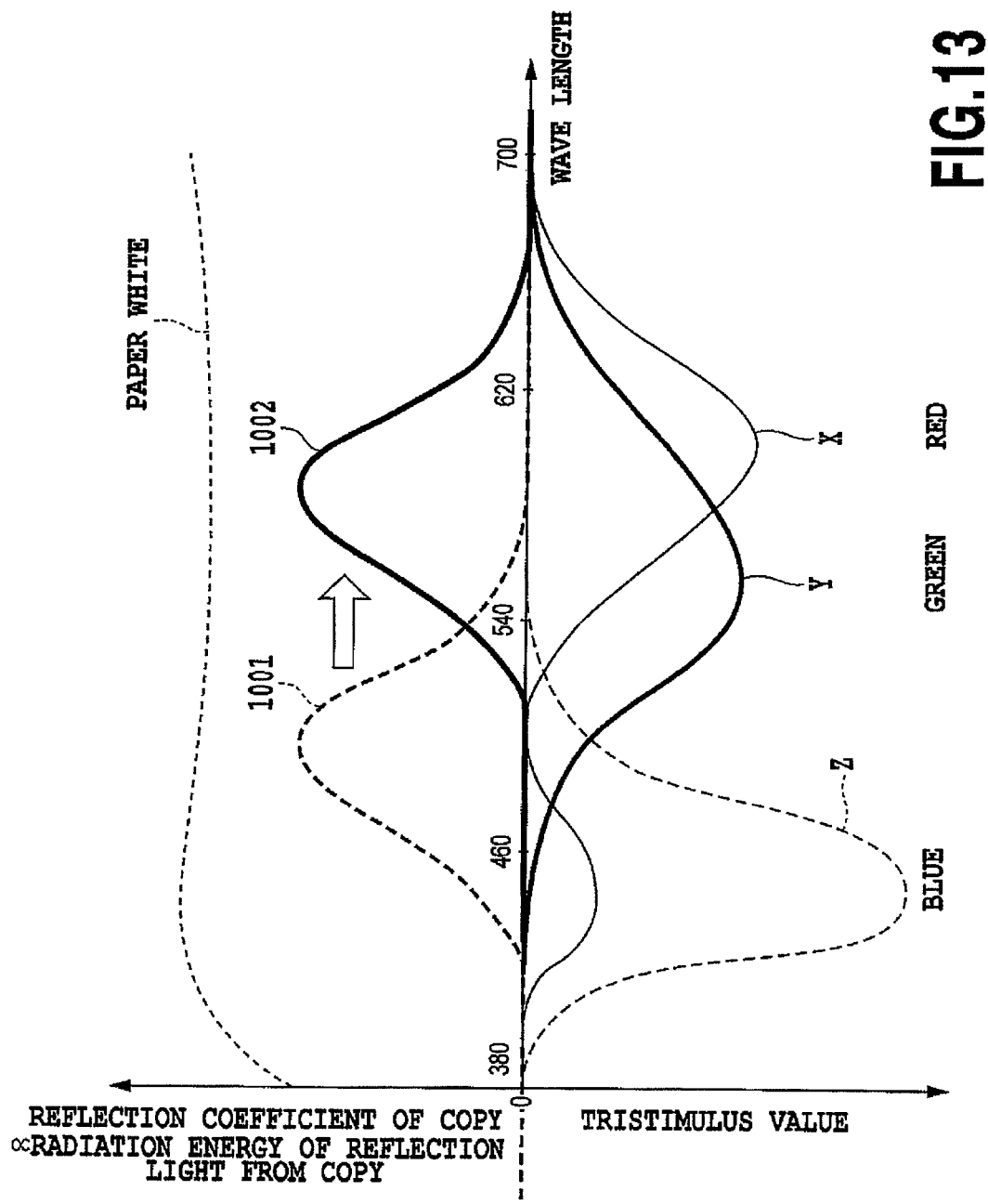
FIG. 13 is a diagram explaining a relation between spectrum and hue.
Figure 14:
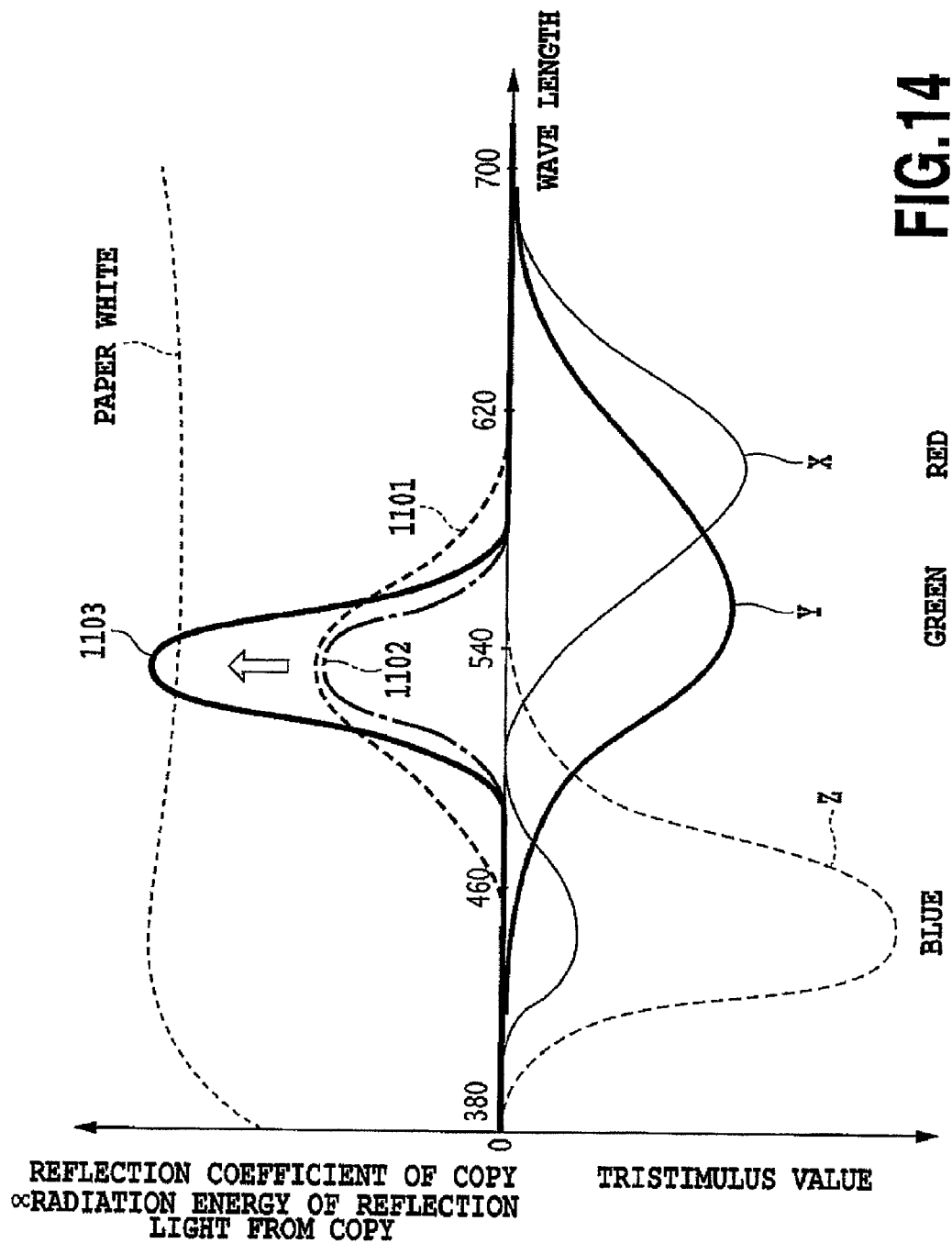
FIG. 14 is a diagram explaining a relation between spectrum and chroma.

FIGS. 12, 13 and 14 are diagrams showing a comparison of xyz color-matching functions with reflected lights from the reflection copy (in the case of a white color light source, showing the tendency similar to a spectral reflection coefficient of the copy) for each wave length. With respect to the lateral axis of the figure, the lower side shows a tristimulus value and the upper side shows a radiation energy of the reflected light (∝ spectral reflection coefficient). It should be noted that the state of non-reflected light shows a black color and "paper white" shown in the figure shows a white color.

(Spectrum and Lightness)

Lightness is represented by a Y value. For increasing (brightening) the Y value shown in Formula 2, light of larger amplitude is entered into a zone where the response of the y color-matching function is active. Accordingly, when the wave length zone is the same in FIG. 12, the reflected light 901 of a small amplitude is small is dark and the light 902 of a large amplitude is bright. It should be noted that lightness is represented by L* in an L* a* b* coloring system.

(Spectrum and Hue)

A hue showing coloring depends on an irradiation zone (wave length) of reflected light. When the amplitude and the wave length zone width are the same in FIG. 13, reflected light 1001 in the short wave length region shows a blue color, the reflection light is shifted to a green color and a yellow color as the wave length becomes longer, and reflected light 1002 in the longer wave length region shows a red color. It should be noted that the hue is specified by a hue angle θ of the following formula 9 in the L* a* b* coloring system.

[Formula 3]

$$\theta = (180/\pi) \tan^{-1}(b^*/a^*) \text{ [deg]} \quad \text{Formula 9}$$

(Spectrum and Chroma)

Chroma showing a vividness of color depends on narrowness of the zone width of reflected light and a height of amplitude of reflected light. When the amplitude is the same in FIG. 14, reflected light 1101 of the wide zone, since lights having more hues are overlapped, has low chroma and reflected light 1102 of the narrow zone has the high chroma. When the zone is the same, reflected light 1103 of a larger amplitude has a higher chroma than reflected light 1102 of a smaller amplitude. It should be noted that the chroma is represented by chroma C* of the following formula 8 in the L* b* coloring system.

[Formula 4]

$$C^* = \sqrt{(a^*)^2 + (b^*)^2} \quad \text{Formula 8}$$

(Color Mixture of Inks and Spectrum)

In a printing system of an area modulation type such as an ink jet printer, when the print medium is observed in a micro way, a portion where a paper white color as the ground color of the print medium is exposed as it is, a portion covered with first ink, a portion covered with second ink, a portion where the first ink and the second ink are mixed (color mixture) or overlapped (layer) on the print medium, and a portion where the ink mixed and the ink overlapped are overlapped, are present in a mixed way, so that the portion formed with ink does not entirely form a layer on the print medium. In addition, in a case of ink like dyestuff where a coloring material molecule is small and the permeability is high, the ink spreads in the depth direction of the print medium and the ink permeated deeply in the print medium has an influence on color reproduction. In contrast, the ink drop like a pigment where a coloring material molecule is large and the permeability is low remains relatively on the print medium and the color agent on the surface tends to be relatively predominant. Further, as seen from that the ink drop on the print medium generates an optical dot gain, besides the light irradiated on the printed ink dots, the light irradiated in the region where no ink dot exists may be transmitted on the print medium to be absorbed by the ink. Therefore, it is not easy to accurately understand the color reproduction of the ink dot on the print medium and the mechanism thereof.

However, for understanding a relation between the color mixture of the ink and the spectrum in summary, it can be thought that the light is filtered (absorbed) by ink of the first layer and thereafter, is filtered by ink of the second layer. It should be noted that here, since exactly speaking, the light absorbed by the first layer is not to be reflected from the print medium regardless of the characteristics of the second layer, in a case where the printed state on the print medium is formed in a layered state, the order of the layers is important.

A color separation processing according to embodiments of the present invention will be hereinafter described in detail. It should be noted that embodiments to be described are simply examples for explaining the present invention and do not limit the scope of the present invention.

First Embodiment

Figure 15:
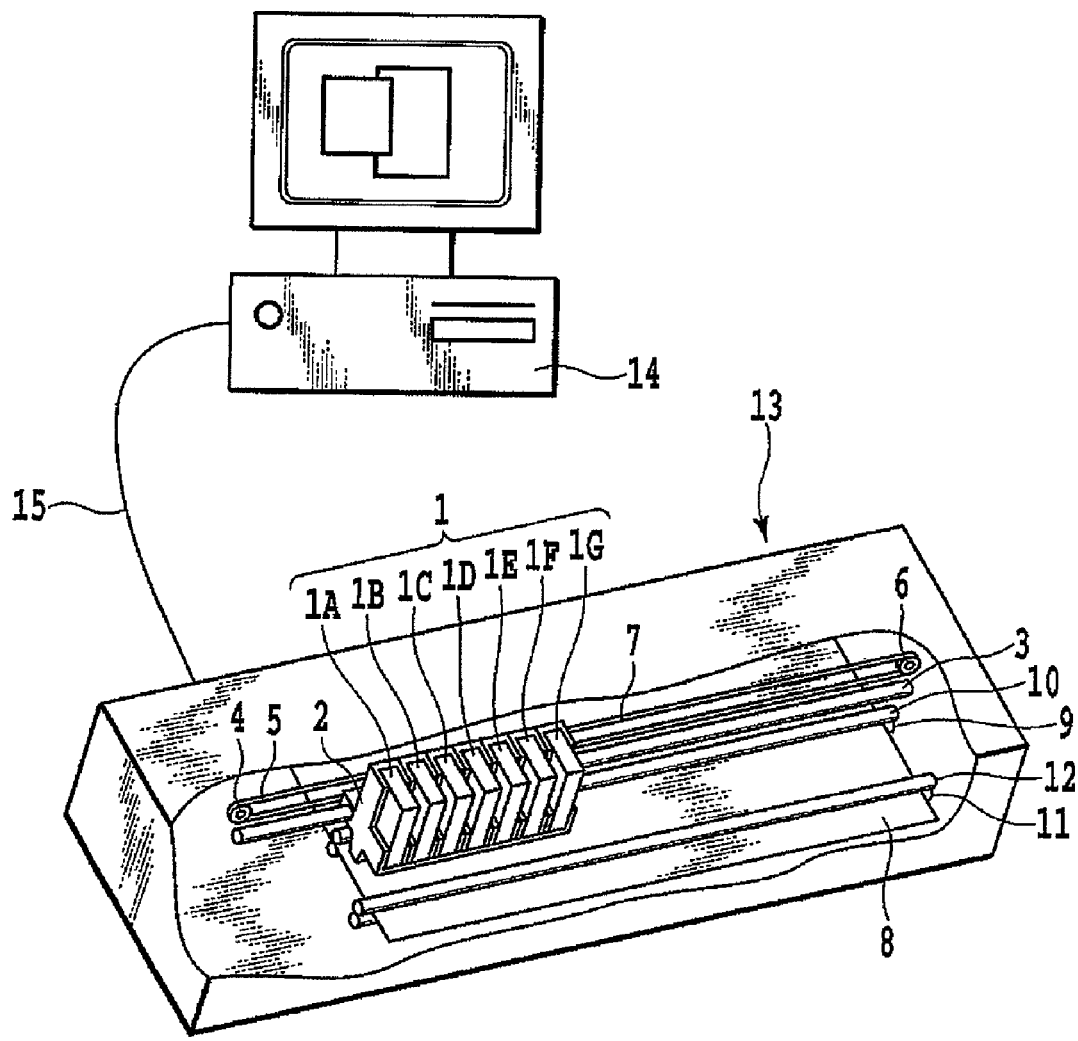
FIG. 15 is a schematic, perspective view showing an arrangement of a printing system by an ink jet printer and a host computer in an embodiment of the present invention.

FIG. 15 is a diagram showing a schematic configuration of a printing system having an ink jet printer and a host computer in an embodiment of the present invention. In FIG. 15, an ink jet printer 13 is provided with a plurality (seven colors) of head cartridges (printing portion) 1A, 1B, 1C, 1D, 1E, 1F and 1G detachably mounted on a carriage 2. It should be noted that in a case of showing the entirety of the plurality of the printing portions 1A to 1G or any one thereof, it is simply shown with the printing portion (print head or head cartridge) 1.

Each cartridge 1 includes an ink tank portion in the upper side and a print head portion (ink eject portion) in the lower side to form the structure of uniting the print head portion and the ink tank. It should be noted that needless to say, the printing portion and the ink tank may be mutually detached. Each printing portion 1 positions a carriage 2 and is mounted to be replaceable. Each printing portion 1 is provided with a connector (not shown) for receiving a signal driving the print head portion. On the other hand, the carriage 2 is provided with a connector holder (electrical connector) for transmitting a drive signal or the like through the connector to each printing portion 1. And each printing portion 1 on the carriage 2 and a control circuit in the side of the device body are connected by a flexible cable for flowing signal pulse current or temperature-modulating current.

The head cartridge 1A has the ink tank portion accommodating ink of K, each of the head cartridges 1B, 1C and 1D has the ink tank portion accommodating ink of C, M and Y respectively, and each of the head cartridges 1E, 1F and 1G has the ink tank portion accommodating ink of R, G and B respectively. In addition, eject ports for discharging the ink are formed in a certain array on a face (in an example shown in the figure, a face directed downwards (not shown)) of each print head portion opposing the print medium 8, making it possible to eject the ink accommodated in each ink tank.

The carriage 2 extends in a main scan direction to be guided and supported in such a manner as to reciprocally move along a guide shaft 3 located in the device body. In addition, the carriage 2 is driven through a motor pulley 5, a driven pulley 6 and a timing belt 7 by a main scan motor 4, and moves such that the position and the speed are controlled. The print medium 8 such as a sheet or a plastic sheet is held between two sets of carrying rollers 9, 10 and 11, 12 and is carried (paper feeding) through a position (printing portion) opposing a eject port face of the print head 1 by rotation of the carrying rollers. It should be noted that the print medium 8 has the back face which is supported by a platen (not shown) so that a flat printing face is formed in the printing portion. In this case, each head cartridge 1 mounted on the carriage 2 is held so that the eject port face extends from the carriage 1 to the downward to be held in parallel with the print medium 8 between the two sets of the carrying rollers.

The ink jet printer 13 formed by uniting them is connected through a cable 15 to the host computer 14 and is controlled by a printer driver installed within the host computer 14.

Figure 16:
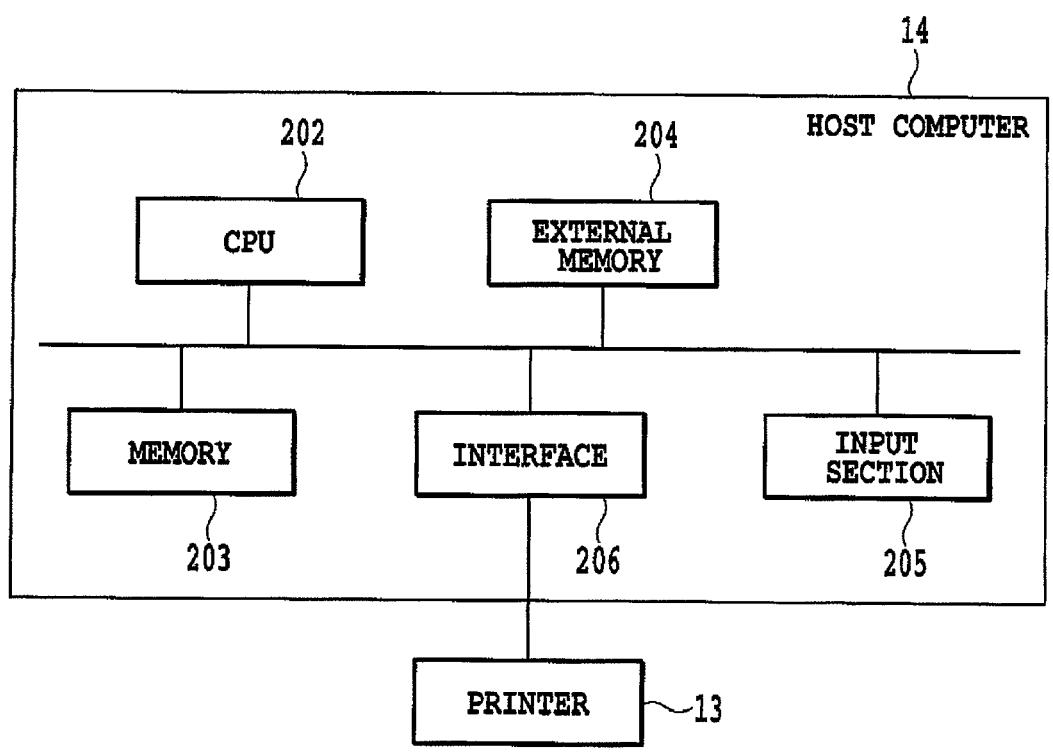
FIG. 16 is a block diagram showing major functions of the host computer shown in FIG. 15.

FIG. 16 is a block diagram showing mainly an arrangement of the host computer in the printing system shown in FIG. 15. The host computer 19 is provided with a CPU 202, a memory 203 such as a RAM or a ROM and an external memory device 209 such as a hard disc. Further, the host computer 14 is provided with an input section 205 to which an input device such as a key board or a mouse is connected and an interface 206 to which peripheral devices such as a printer are to be connected. The respective sections are connected with each other through a system bus. The CPU 202 executes a program stored in the memory 203, thereby executing an image processing to be described later in FIG. 17. This program is stored in an external memory device 204 or the like and is supplied from the external memory device 204 to the memory 203 as needed.

The host computer 14 is connected through the interface 206 to the printer 13 to feed an image data image-processed to the printer 13, making the printer 13 perform a printing action.

Figure 17:
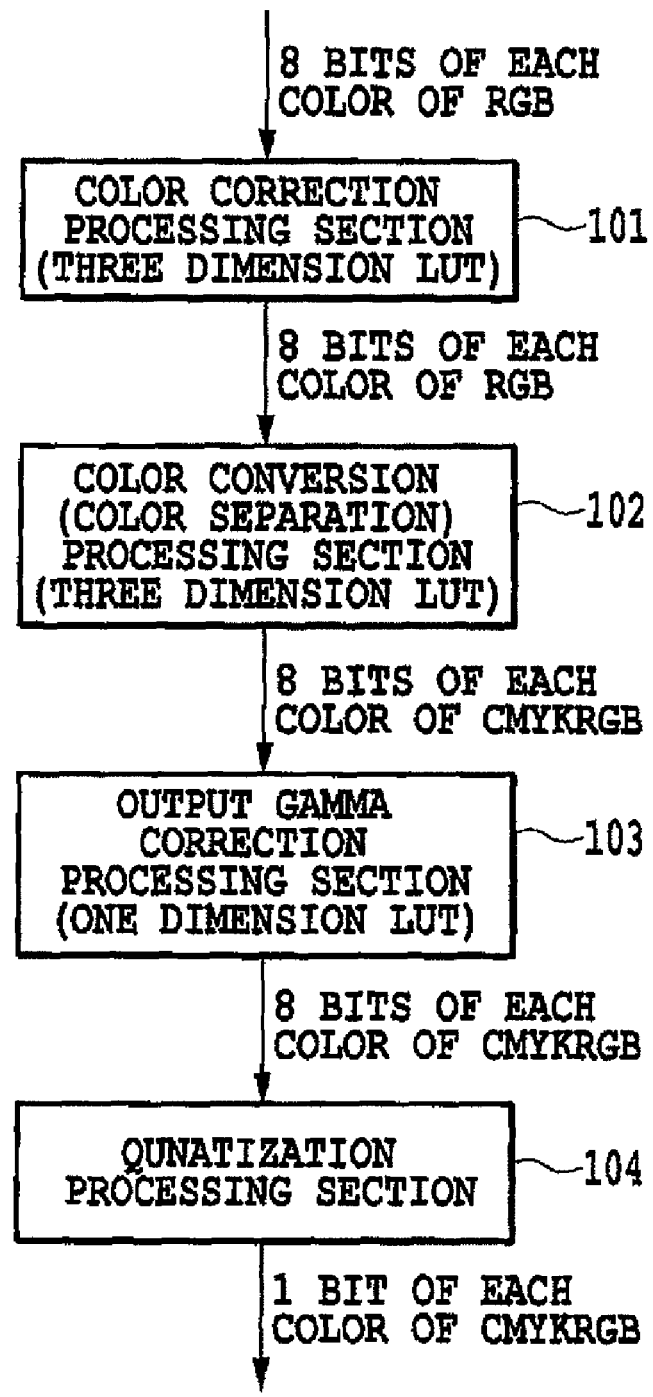
FIG. 17 is a block diagram showing an image processing executed in a host computer shown in FIG. 16.

FIG. 17 is a block diagram showing main functions of an image processing executed by the host computer 19 and shows the processing to execute conversion of an input image data of 8 bits (256 gradation levels) of each of colors R, G and B and output the print data of one bit of each of colors C, M, Y, K, R, G and B. It should be noted that this processing is realized as a printer driver acting on the host computer 14.

The image data of 8 bits of each of colors R, G and B as the input data is, at a color correction processing section 101, corrected to be the image data of 8 bits of each of colors R, G and B having colors of a color gamut which the printer can reproduce. This processing is executed by using a three-dimension look-up table (LUT) together with the interpolation calculation. More specially for example, for producing a desired color reproduction such as color reproduction by a RGB monitor, a gamut mapping technology is used to perform color matching for adapting the color reproduction region of the printer 13 to an appropriate color target on an uniform color space such as L* a* b*. The known technology may be used as this gamut mapping technology. It should be noted that the color correction processing is not necessarily required to use a table and the color correction processing may be executed by an appropriate linear or non-linear color correction function.

Next, a color conversion processing section 102 executes color separation processing to be described later in FIG. 28 or the like where the RGB image data is converted into an image data of 8 bits of each of colors C, M, Y, K, R, G and B. This processing is also executed by using the three-dimension LUT together with the interpolation calculation. This processing causes a combination of color signals C, M, Y, K, R, G and B of ink at the time of reproducing an image represented by the color signal RGB with a printer to be determined.

An output gamma correction section 103 executes an output gamma correction for image data of 8 bits of each of colors C, M, Y, K, R, G and B obtained by the color conversion processing, by using a one dimensional LUT. The output gamma correction, in many cases, guarantees a linear relation between an image data of 8 bits of each of colors C, M, Y, K, R, G and B inputted by correcting a relation between the printing dot number per unit area which does not become linear and output characteristics (reflection density or the like) and output characteristics of an image to be formed.

Further, the image data of 8 bits of each of colors C, M, Y, K, R, G and B is quantized in accordance with the printing mechanism of the printer 13 at a quantization processing section 104. For example, if the printer 13 is a binary printer, the image data of 8 bits is quantized to the data of one bit (binary value) of each of colors C, M, Y, K, R, G and B. This quantization method can use a known error diffusion method or dither method. It should be noted that this quantization processing performs, for example, quantization to four level values larger than a binary value, and in a printer, a dot pattern expansion may be made based upon the data of the four level values to finally obtain a binary data for driving the print head.

Color Separation Method

Creation of a color separation table of a three-dimension LUT form used in a color conversion processing section 102 (FIG. 17) will be made as follows. First, lattice points in LUT of a cube shown in FIG. 18 are defined. In the embodiment, the lattice points of LUT are defined by, for example the upper 4 bits among inputted 8-bit data of each of R, G and B. In this case, lattice points of 24×24×24 in the cube shown in FIG. 18 are defined in accordance with RGB signals. In addition, the lower 9-bit data among inputted 8-bit data of each of R, G and B are used as weighing data (ratio of internal division) in the interpolation calculation. Here, the lattice point White in FIG. 18 is a point (lattice point) where a set of color signals (R, G and B) are specified by (255, 255, 255). Likewise, magenta is a point specified by (255, 0, 255), and yellow is a point specified by (255, 255, 0). Further, red is a point specified by (255, 0, 0). Green is a point specified by (0, 255, 0). Blue is a point specified by (0, 0, 255). Black is a point specified by (0, 0 and 0).

In the cube in FIG. 18 where such lattice points are defined, the lattice point, for which an ink amount (value of 8 bits of each of Y, M, C, K, R, G and B) is to be determined by the color separation method in the embodiment, is selected. More specifically, the color separation processing is executed with respect to lattice points on each of a W-C (B, M, R, Y, and G) line and a C (B, M, R, Y and G)-k line, each of C-B, C-G, B-M, M-R, R-Y and Y-G lines, and a W-K line, respectively, to determine the ink amount. Combinations of ink amounts of respective color as thus determined lattice point data are made to correspond to the lattice points to be stored as a table data.

Further, an ink amount of the lattice point other than points on the above lines in the cube is determined based on the lattice point data of each line defined as described above, by using an interpolation. An example of this method may use an interpolation technique disclosed in Japanese Patent Laid-Open No. 2002-33930. Thus obtained lattice point data other than points on the lines are, likewise, made correspond to the lattice points to be stored.

The embodiment of the present invention uses a particular color recording material as a complementary color in a color separation at a low lightness portion of a device secondary color defined as a color on a G-K line 42 shown in FIG. 18. Hereinafter, this color separation of the embodiment will be explained in comparison with cases that use a recording material of a basic color or a quasi-basic color as a complementary color.

It should be noted that here, particular color G ink reproducing a secondary color on the G-K line 42 is of realizing high lightness and high chroma. Comparative examples and an embodiment use particular color G ink and basic color C and Y ink commonly for the respective color separation on the G-K line. Then, the comparative examples and embodiment, in which different recording materials (inks) are used as a complementary color component in addition to the above stated inks, will be explained.

Comparative Example 1

Color Separation A1 without Particular Color

Figure 19:
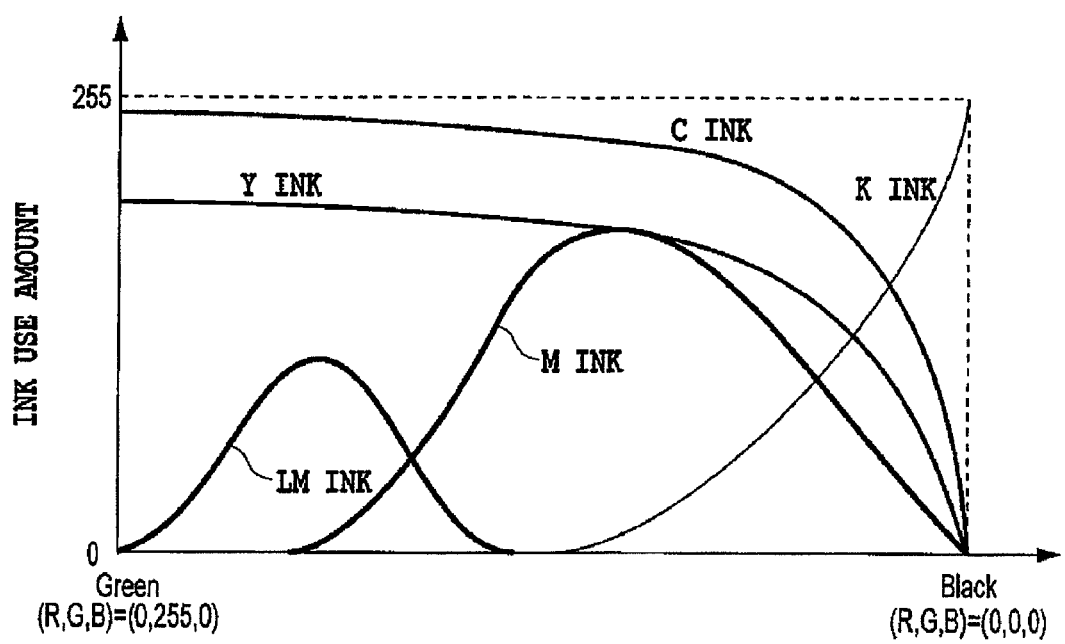
FIG. 19 is a diagram explaining color separation of a G-K line in a case of preparing a pure color component in color separation without a particular color, relating to a comparison example in the embodiment of the present invention.

FIG. 19 is a diagram showing color separation for the G-K line shown in FIG. 18, in a six-color ink system of C, M, Y, K, LC and LM without use of a particular color.

In FIG. 19, the left end of a lateral axis is a device secondary color G ((R, G and B)=(0, 255, 0)) and the right end of the lateral axis is a device K ((R, G and B)=(0, 0 and 0)), and the longitudinal axis shows each color ink use amount.

In this example, the device secondary color on the G-K line is basically composed of a pure color component formed with a color mixture of basic color C ink and basic color Y ink. This pure color component remains substantially constant from a point G to a point immediately before a point of the device K, reduces immediately before the device K point, and becomes zero at the device K point.

As the complementary color components for the G-K line, LM, M, and K inks are used. From the device secondary G point, LM ink is used for preventing a granular feeling while lowering lightness and chrome at the same time, and is switched by M ink at a point where dots become unnoticeable even if M is added. The lightness and the chroma are lowered at the same time with a continuous increase of M, and K starts to enter at a point where dots become unnoticeable even if K is added. After that, K monotonically increases to the device K.

Figure 1:
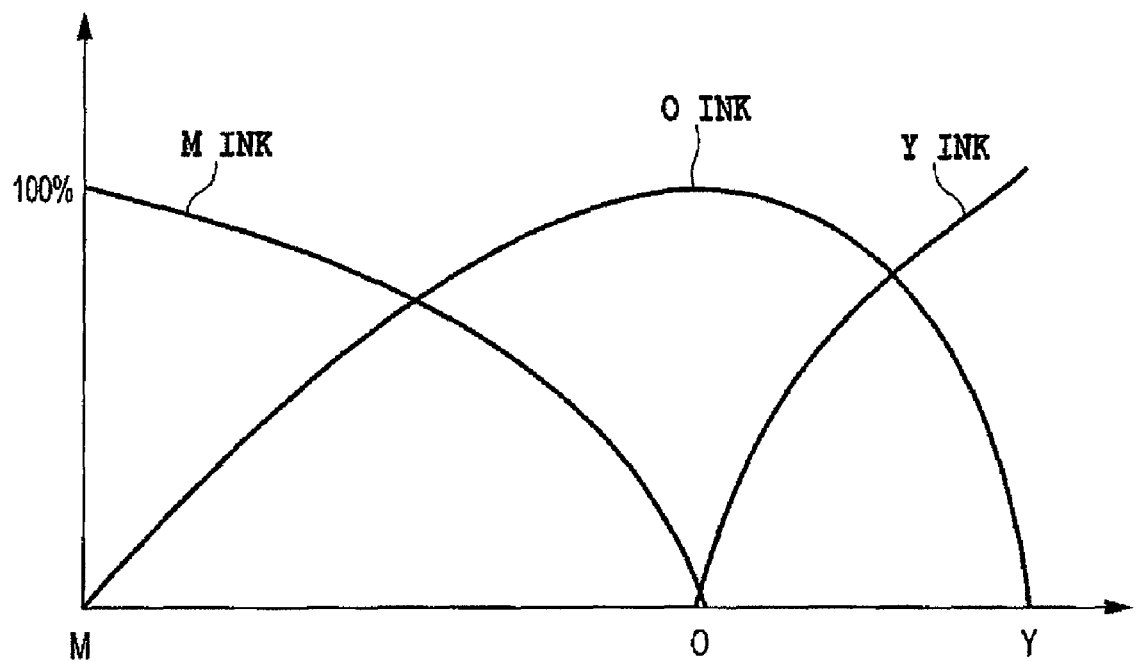
FIG. 1 is a diagram explaining color separation between device M and Y using a particular color ink in the conventional example.
Figure 2:
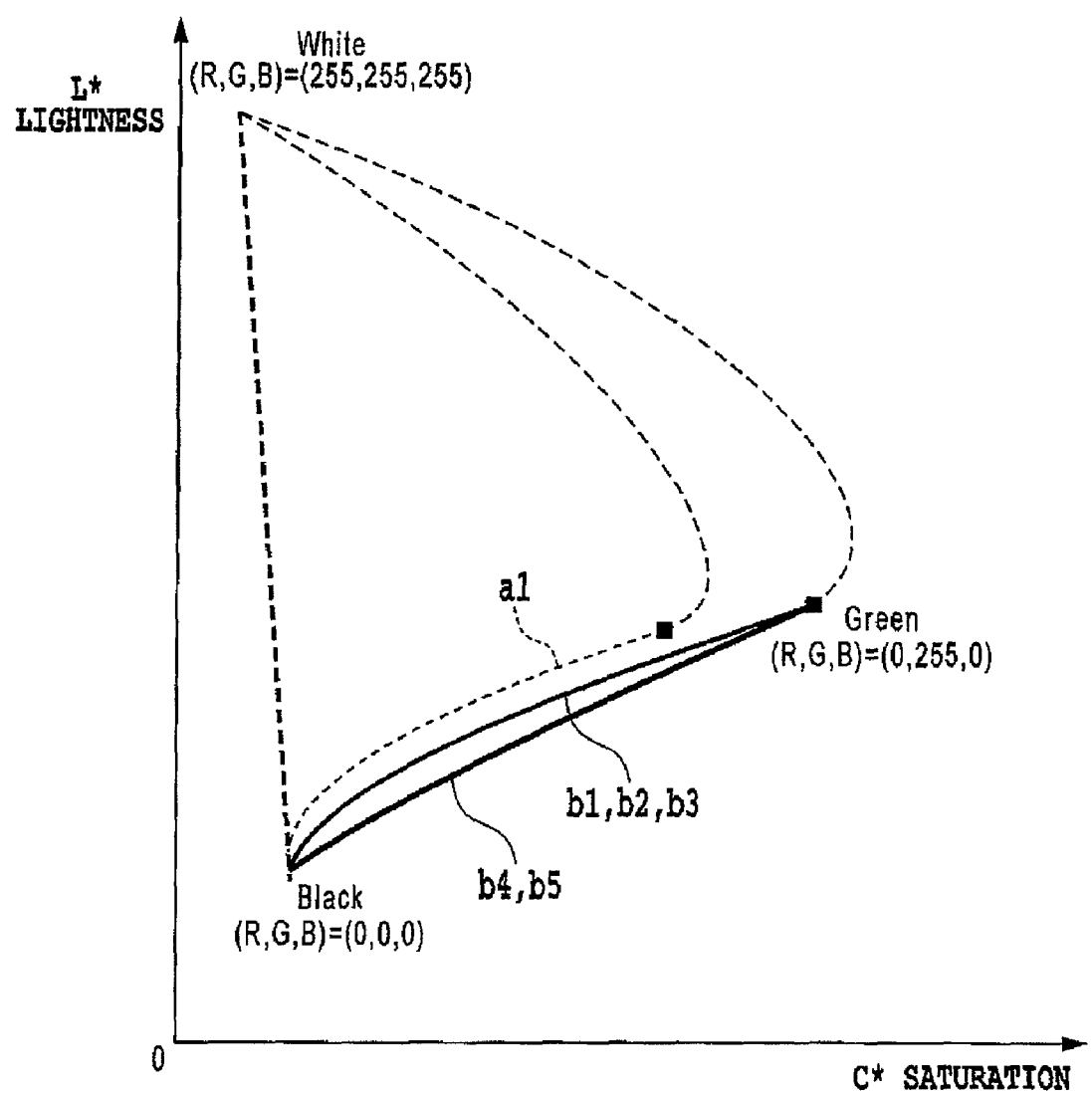
FIG. 2 is a diagram showing each color reproduction region in a printer by each color separation method, on a C* L* plane.
Figure 3:
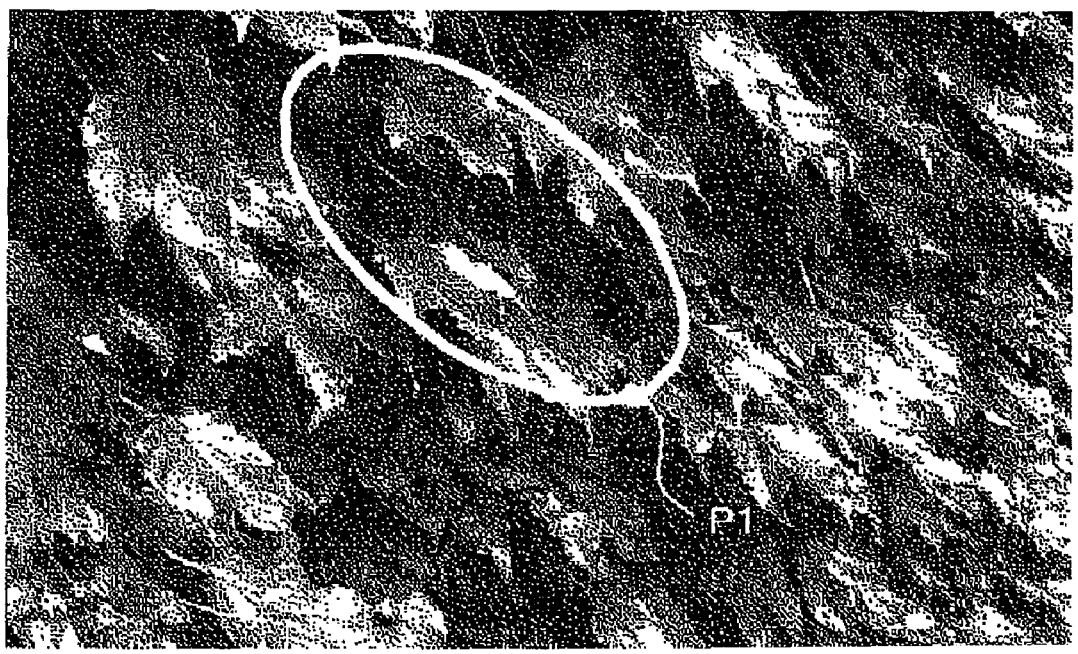
FIG. 3 is a photo showing a color reproduction of an image of green ivy by a gamut where chroma at a dark portion is low.
Figure 4:
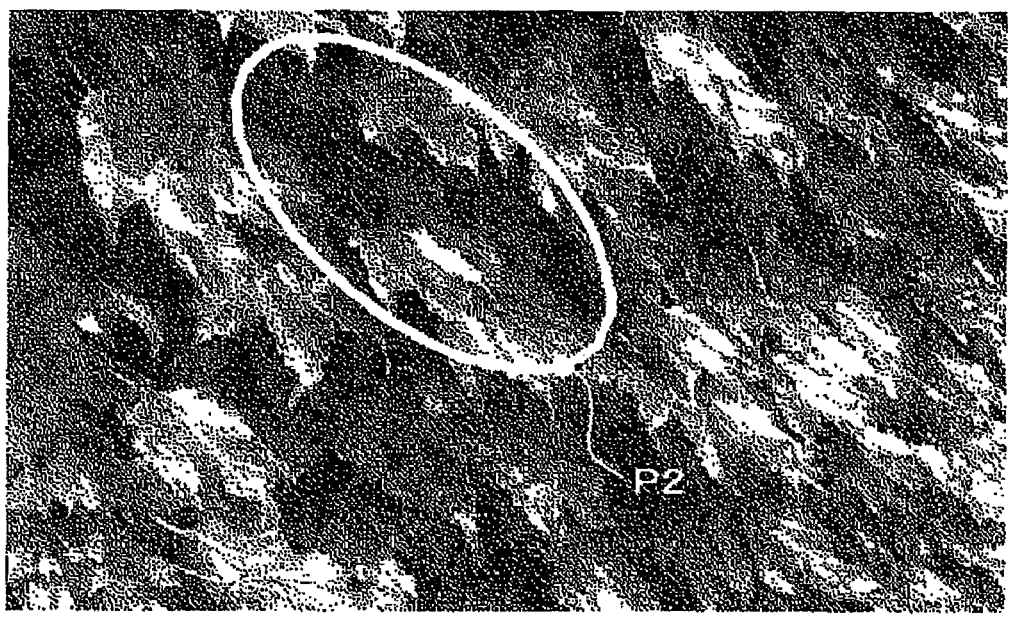
FIG. 4 is a photo showing a color reproduction of an image of green ivy by a gamut where chroma at a dark portion is high.
Figure 5:
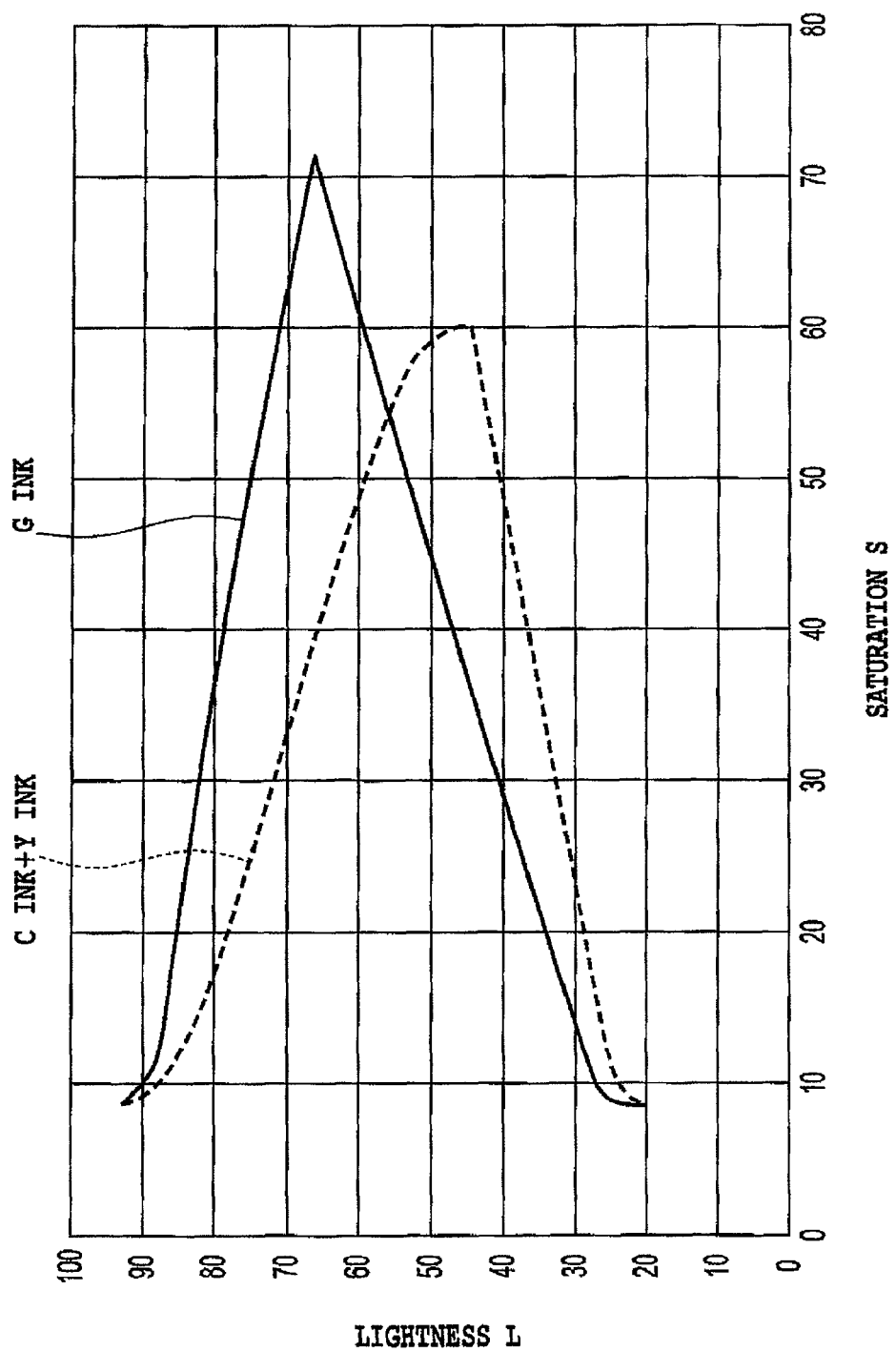
FIG. 5 is a diagram explaining a color reproduction characteristic of a particular color used in another conventional example by comparing it with a case of using a basic color C and a basic color Y.
Figure 6:
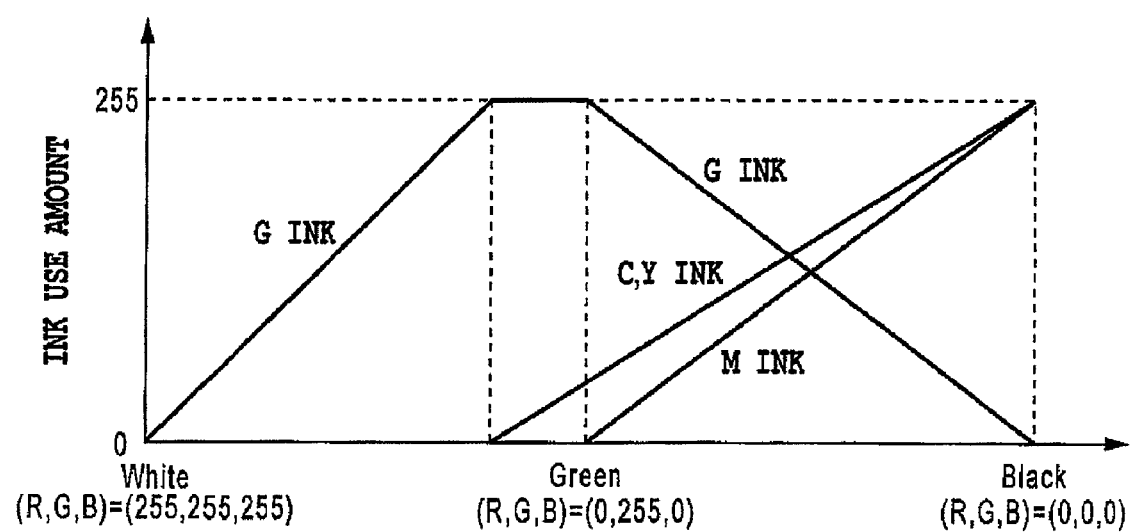
FIG. 6 is a diagram explaining the color separation shown in FIG. 5 by using a W-G-K line as an example.
Figure 7:
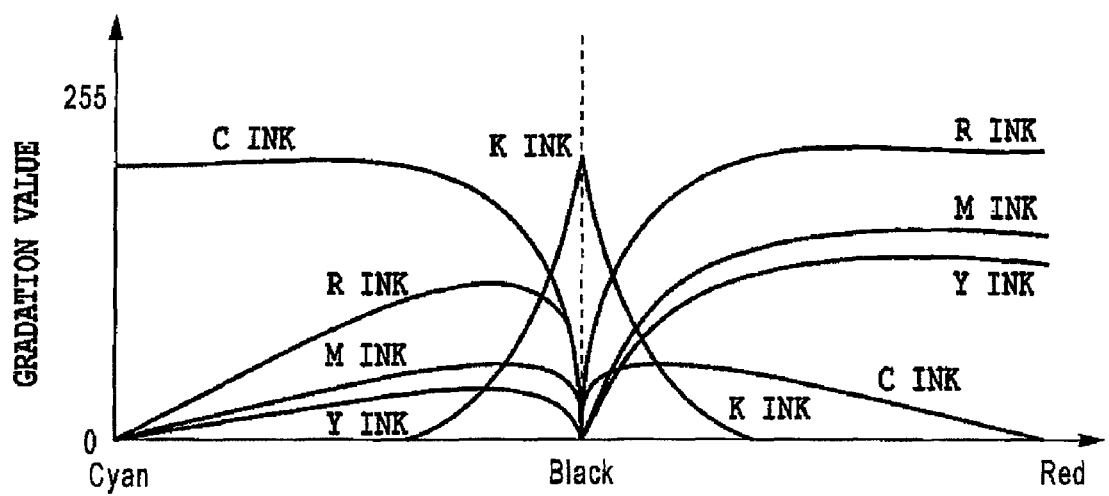
FIG. 7 is a diagram explaining color separation relating to a further other conventional example by using a C-K line and a R-K line as an example.
Figure 20:
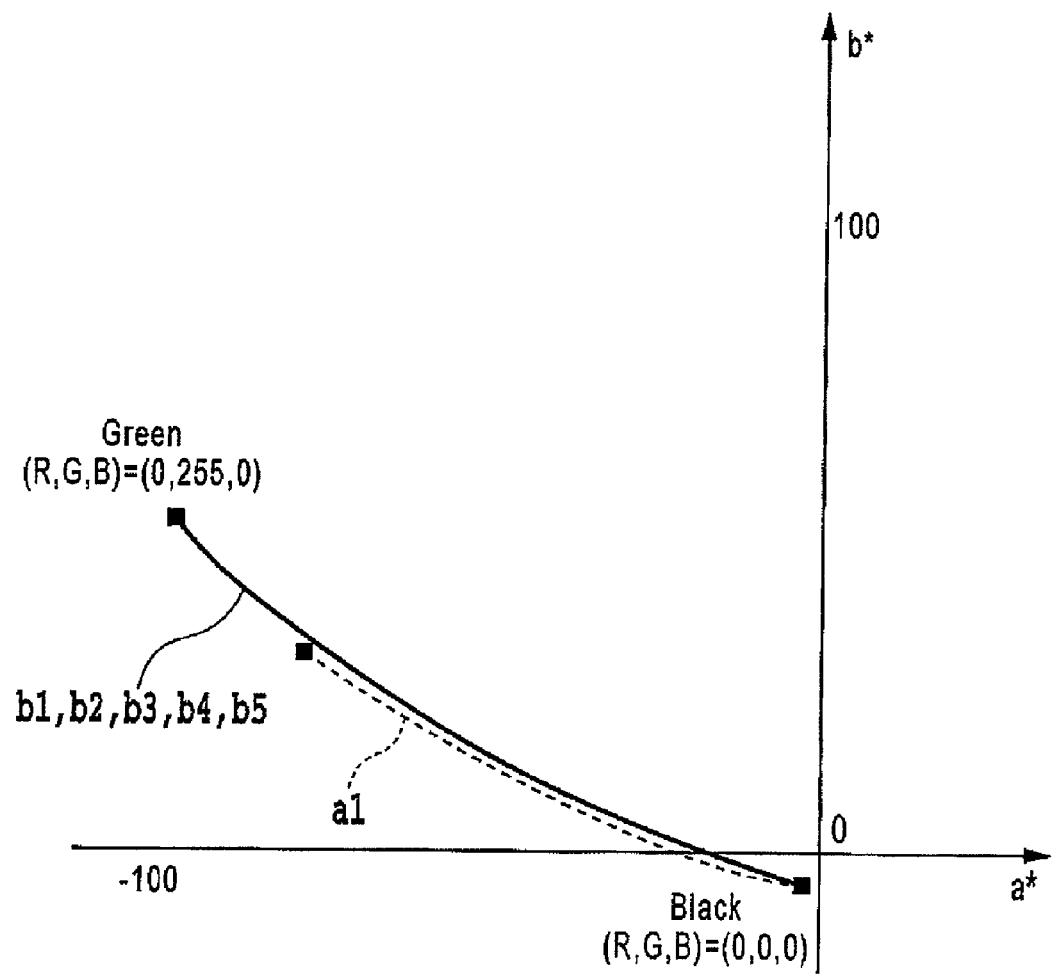
FIG. 20 is a diagram showing each color reproduction region in a printer by each color separation, on an a* b* plane.
Figure 21:
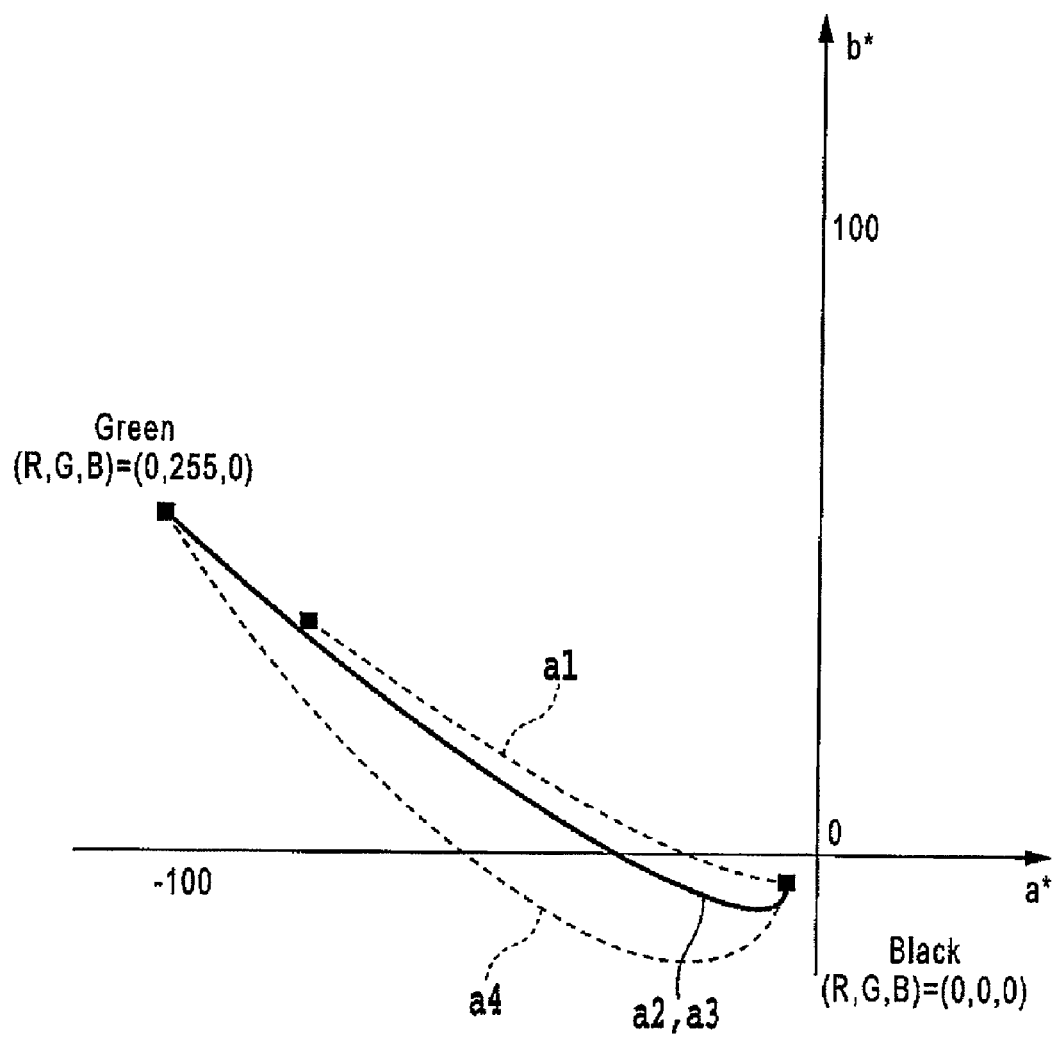
FIG. 21 is a diagram showing each color reproduction region in a printer by each color separation, on an a* b* plane.

The color reproduction by the above described color separation A1 is made like a reproduction line a1 in each of FIGS. 2, 20 and 21. As seen from these figures, in the color separation A1 without use of the particular color, although the hue on the G-K line is made substantially a desired hue, the chroma is low as a whole and particularly this inclination is significant at the dark portion (FIG. 2).

Comparative Example 2

Figure 22:
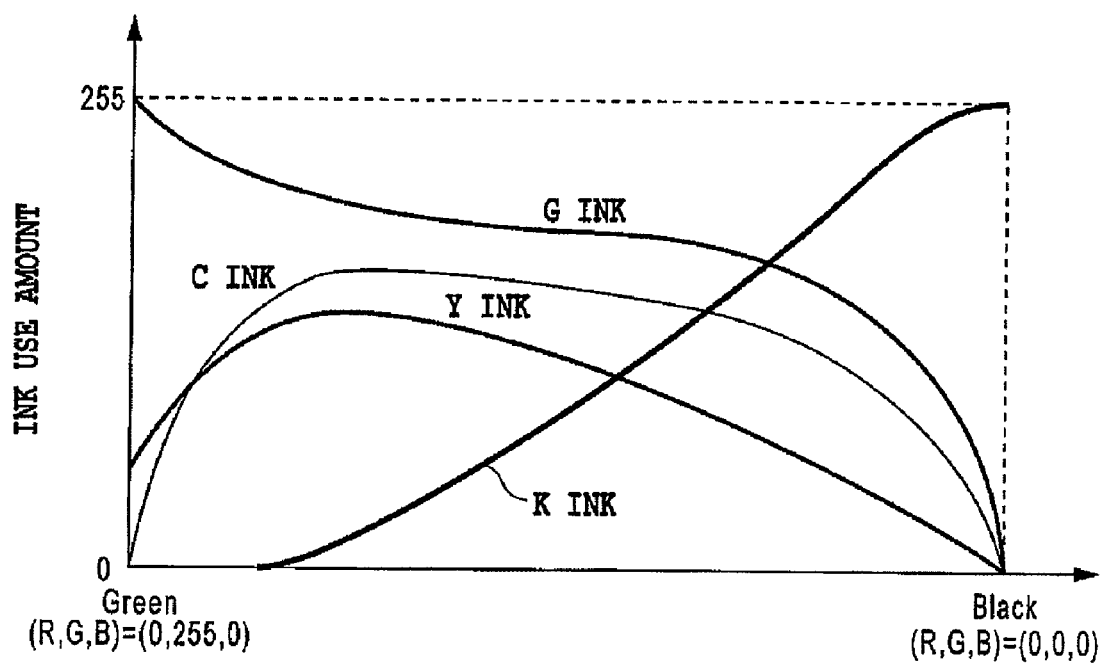
FIG. 22 is a diagram explaining color separation of a G-K line in a case of preparing a pure color component by using a complementary color component as K only, relating to the other comparison example.

Color Separation A2 (without Hue Adjustment on the G-K Line) Using a Pure Color Component as in Comparative Examples 3 and 4 and Using K Only as a Complementary Color Component FIG. 22 is a diagram showing a case of using K only as a complementary color component in the color separation for the G-K line, which uses inks of four colors of Y, K and G including particular color G ink. It should be noted that, for comparison, there is shown color separation where the pure color component is fixed, the hue adjustment on the G-K line is not made and only the complementary color component is simply changed.

As shown in FIG. 22, a device secondary color G is expressed with a pure color component composed of a color mixture of particular color G ink and basic color Y ink for toning the particular color G ink. Closer to the dark portion, the particular color G ink is reduced and the basic color C ink and the basic color Y ink are increased once. Thereafter, the basic color C ink and the basic color Y ink are reduced immediately before a device K point for lowering the chroma and the lightness. It should be noted that an ink amount of the basic color Y ink is reduced earlier than that of the basic color C ink and this is the result due to adjustment of the hue at the dark portion.

In this example, the K ink is used as the complementary color component, starts to enter from a slightly darker point than the device secondary G point and monotonically increases toward the device K point. It should be noted that the reason the input starting portion of the K ink is not the device secondary color G point, but the slightly darker point is that both of the chroma and the lightness are lowered only by reducing the particular color G ink with high chrome and high lightness and replacing it for a color mixture of the basic color C ink and the fundamental Y ink.

The color reproduction by this color separation A2 becomes like a reproduction line a2 on an a* b* plane shown in FIG. 21. As seen from the figure, in the color separation A2, the hue on the G-K line deviates relatively largely from a desired hue.

Comparative Example 3

Figure 23:
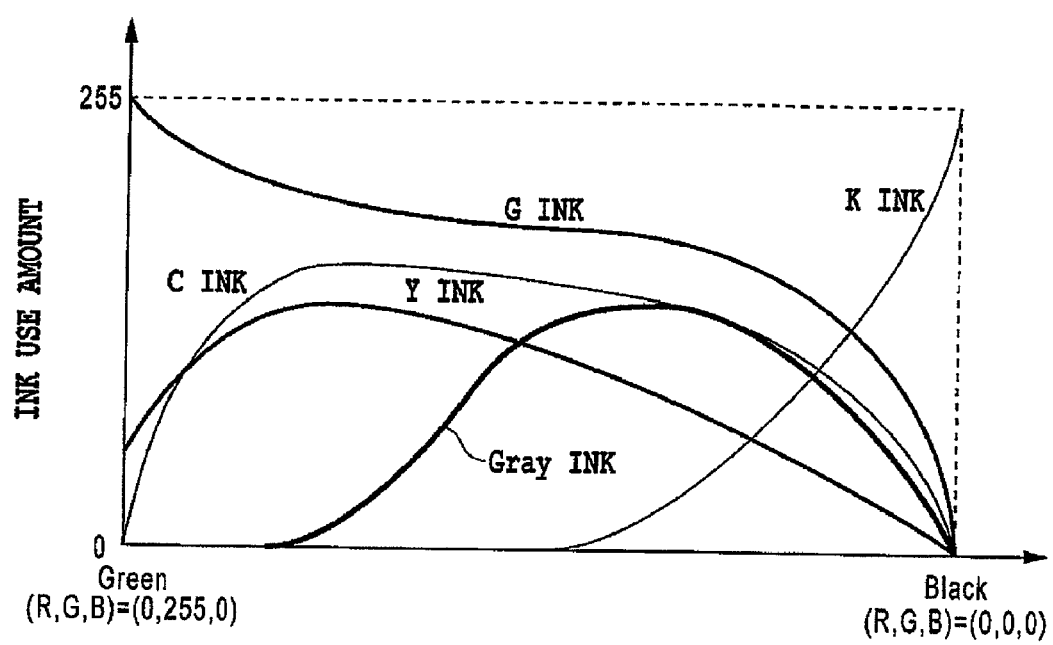
FIG. 23 is a diagram explaining color separation of a G-K line in a case of preparing a pure color component by using complementary color components as Gry and K, relating to the other comparison example.

Color Separation A3 Using a Pure Color Component as in Comparative Examples 2 and 4 and Using Gry and K as Complementary Color Components FIG. 23 is a diagram showing a case of using Gry and K as complementary color components in color separation for the G-K line, using ink of five colors of C, Y, K, G and Gry including particular color G ink. Also in this example, for comparison, the pure color component is fixed, the hue adjustment on the G-K line is not made and only the complementary color components are simply changed.

An ink use amount of the pure color component is similar to that in a case in FIG. 22 relating to the comparative example 2.

In an example shown in FIG. 23, as the complementary color components, the Gry ink and the K ink are used. The lightness and the chroma are lowered at a region little distant from the device secondary color G point by respective decrease and increase of the particular color G, and the basic colors C and Y. Thereafter, the complementary color components are added. The Gry ink is used for decreasing the granular feeling while reducing lightness and chroma at the same time, and the K ink starts to be used at a point where dots become unnoticeable even if the K ink is added. After that, the K ink monotonically increases to the device K point.

The color reproduction by the above described color separation A3 becomes like a reproduction line a3 shown in FIG. 21 or the like. As seen from the figure, in the color separation A3, the hue on the G-K line deviates relatively largely from a desired hue.

Comparative Example 4

Figure 24:
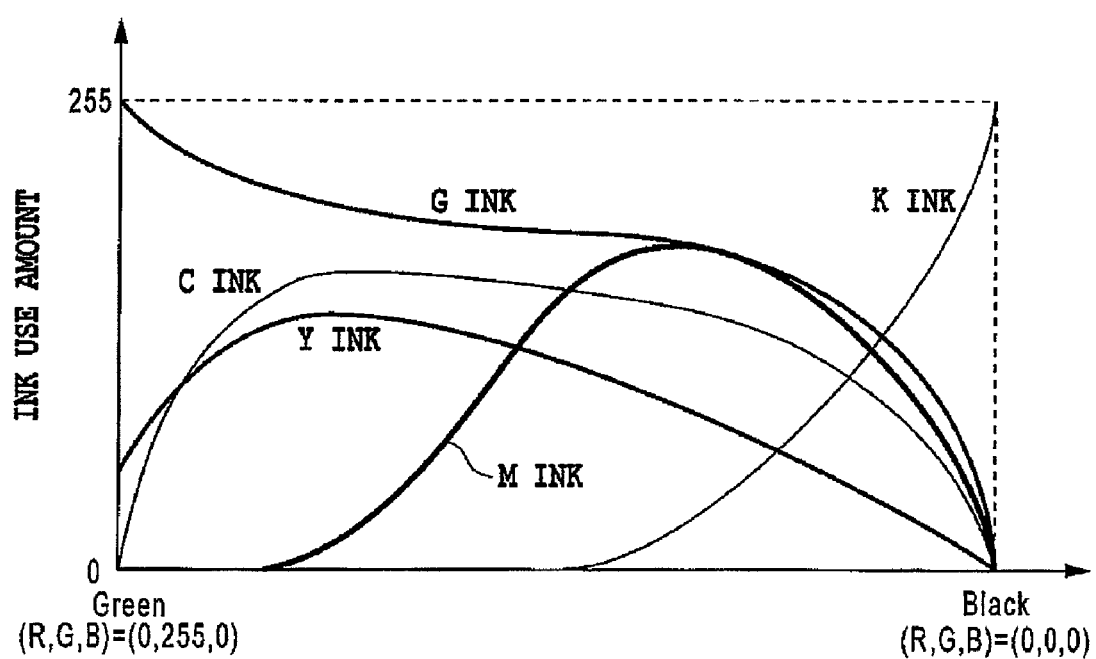
FIG. 24 is a diagram explaining color separation of a G-K line in a case of preparing a pure color component by using complementary color components as M and K, relating to the other comparison example.

Color Separation A4 Using Pure Colors as in Comparative Examples 2 and 3 and Using M and K as Complementary Color Components FIG. 24 is a diagram showing a case of using M and K inks as complementary color components in a color separation for the G-K line shown in FIG. 18, using ink of five colors of C, M, Y, K and G including particular color G ink. In this example, as is similar to the above, for comparison, the pure color components are fixed, the hue adjustment on the G-K line is not made and only the complementary color component is simply changed.

An ink use amount of the pure color components are similar to that in a case in FIG. 22 relating to the comparative example 2.

As shown in FIG. 24, as the complementary color components, the M ink and the K ink are used. At a little distance point from the device secondary color G point, the M ink of the complementary color component is added. The M ink is used for preventing the granular feeling while lowering lightness and chroma at the same time, and the K ink starts to be used at a point where dots become unnoticeable even if the K ink is added. After that, the K ink monotonically increases to the device K.

The color reproduction by this color separation A4 becomes like a reproduction line a4 in FIG. 21 or the like. As seen from the figures, in the color separation A4, the hue on the G-K line deviates relatively largely from a desired hue.

In the comparative examples 2 to 4 as described above, the ink amount of the pure color components are fixed and the ink amount of the complementary color components only are replaced for comparison. However, in a case where it is required to exactly compare the chroma as in the case of the embodiment of the present invention, the comparison in a state where the hue deviates is in fact meaningless. That is, the chroma C* is determined simply as a Euclidean distance from a point (a*, b*)=(0, 0) like the above formula: Formula 8. From this point, it is possible to conduct the comparison is possible even if the hue of a comparison object deviates. However, it can not be thought that the color separation table where the hue deviates relatively largely like the reproduction line a4 in FIG. 21 is made without color adjustment.

Therefore, there are hereinafter explained comparative examples where the minimum color adjustment is made with regard to an ink amount of the pure color components for making the G-K line a desired hue like the reproduction line b1 shown in FIG. 20.

Comparative Example 5

Figure 25:
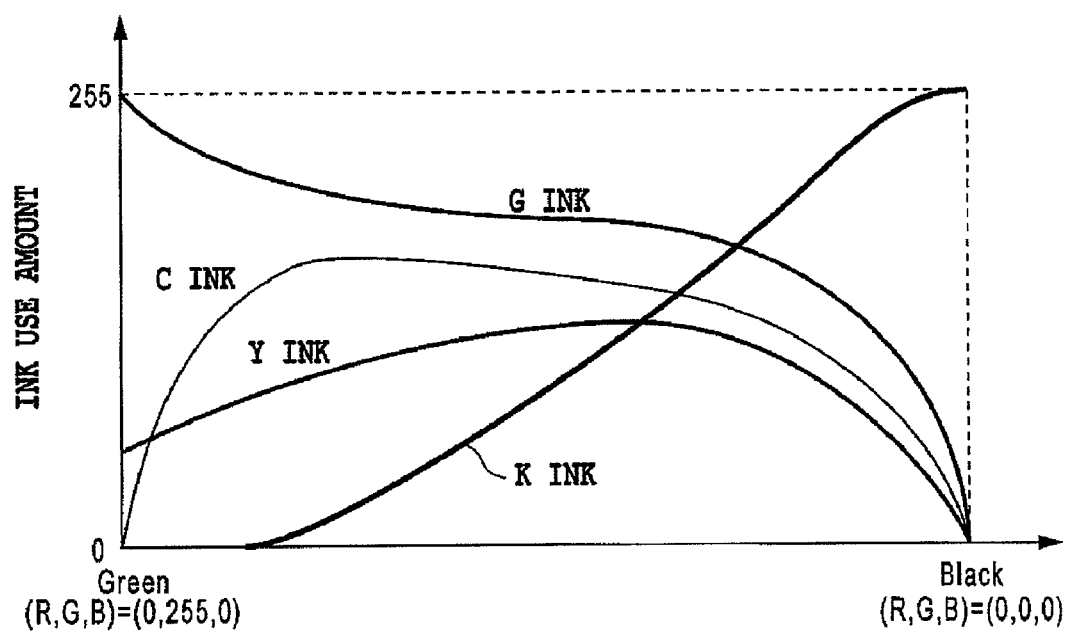
FIG. 25 is a diagram explaining color separation of a G-K line in a case of preparing a hue of a G-K line by using a complementary color component as K only, relating to the other comparison example.

Color Separation B1 (Ink Amount of the Pure Color Component is Different) in Which the Hue on the G-K Line is Adjusted to be the Same as in Comparative Examples 6 and 7, and K is Only Used as a Complementary Color Component FIG. 25 is a diagram showing color separation for the G-K line shown in FIG. 18, using ink of four colors of C, Y, K and G including particular color G ink. This example of the color separation shows that K ink is only used as a complementary color component and ink of the pure color components are adjusted so that the G-K line is nearly linearly reproduced on the a* b* plane.

As shown in FIG. 25, the particular color G ink is reduced and the basic color C and the basic color Y are reduced as in the case of the color separation in FIG. 22. However, the Y ink use amount at the dark portion is increased for toning.

The K ink is used as the complementary color component as in the case of the color separation in FIG. 22, starts to enter from a slightly darker point than the device secondary color G point and monotonically increases to the device K point.

The color reproduction by this color separation B1 becomes like a reproduction line b1 on the C* L* plane shown in FIG. 2. As seen from the figure, in the color separation B1, the color reproduction at the dark portion on the G-K line is made convex upwards and the chroma is not sufficient.

Comparative Example 6

Figure 26:
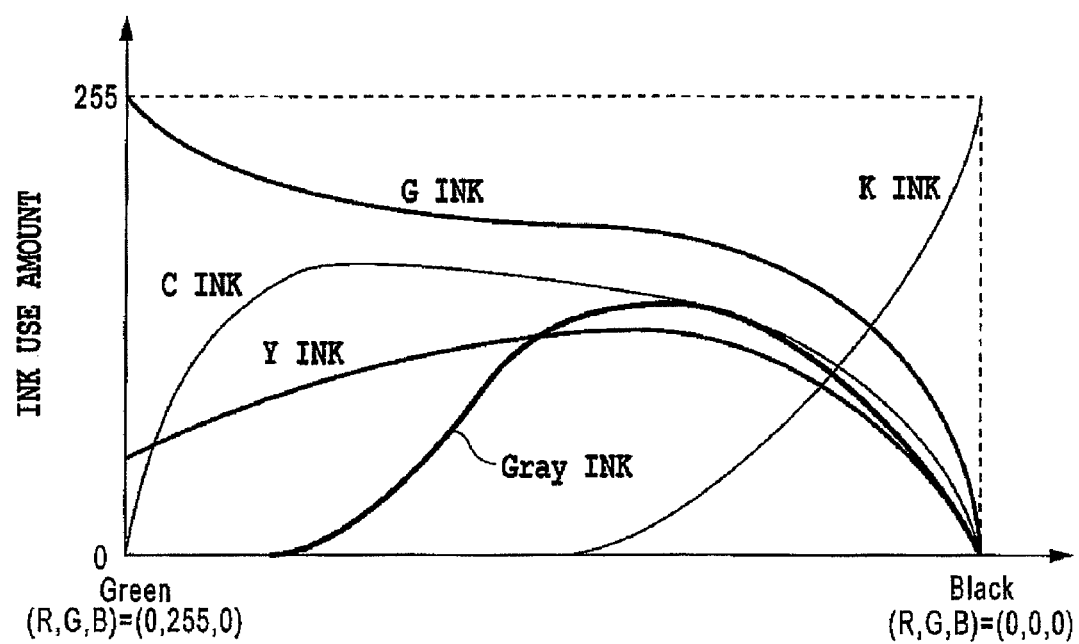
FIG. 26 is a diagram explaining color separation of a G-K line in a case of preparing a hue of a G-K line by using complementary color components as Gry and K, relating to the other comparison example.

Color Separation B2 in Which the Hue on the G-K Line is Adjusted to be the Same as in Comparative Examples 5 and 7, and Gry and K are Used as Complementary Color Components FIG. 26 is a diagram showing color separation for the G-K line, using ink of five colors of C, Y, K, G and Gry including particular color G ink. This example of color separation shows that the Gry ink and the K ink are used as complementary color components and inks of the pure color components are adjusted so that the G-K line is nearly linearly reproduced on the a* b* plane.

As shown in FIG. 26, the particular color G ink is reduced and the basic color C and the basic color Y are also reduced as in the case of the color separation in FIG. 22. However, the Y ink at the dark portion is increased for toning.

As in the case of the color separation in FIG. 23, as the complementary color components, the Gray ink and the K ink are used. At a little distant point from the device secondary color G point, the Gray ink of the complementary color component is added. Thus the Gry ink is used for preventing the granular feeling while lowering lightness and chroma at the same time and the K ink starts to be used at a point where dots become unnoticeable even if the K ink is added. After that, the K ink monotonically increases to the device K.

The color reproduction by this color separation B2 becomes like a reproduction line b2 shown in FIG. 2. As seen from the figure, in the color separation B2, the color reproduction at the dark portion on the G-K line is made convex upwards and the chroma is not sufficient.

Comparative Example 7

Figure 27:
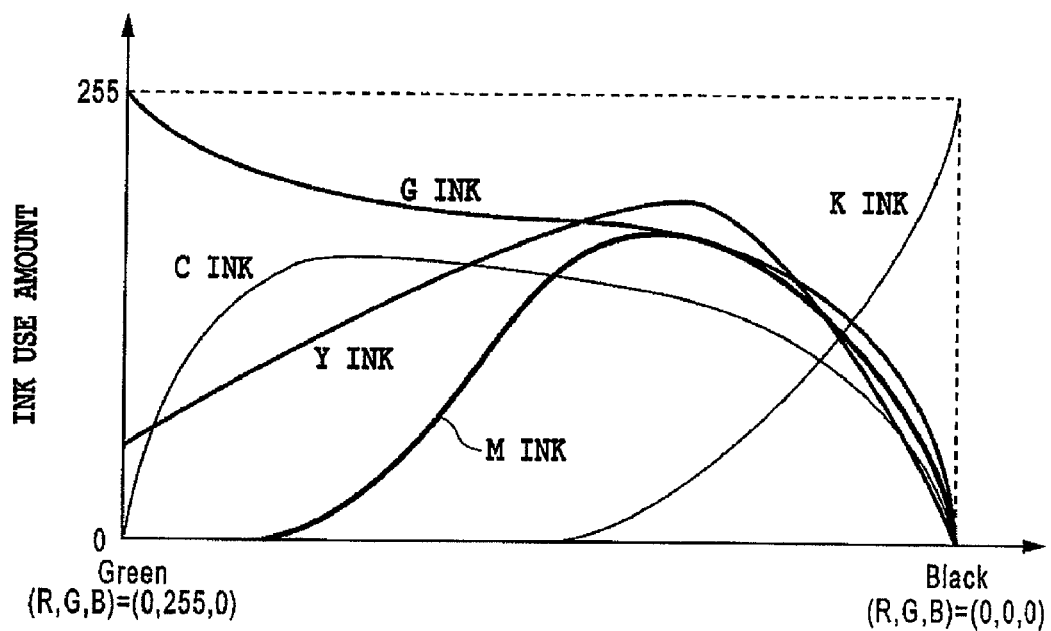
FIG. 27 is a diagram explaining color separation of a G-K line in a case of preparing a hue of a G-K line by using complementary color components as M and K, relating to the other comparison example.

Color Separation B3 in Which the Hue on the G-K Line is Adjusted to be the Same as in Comparative Examples 5 and 6, and M and K Inks are Used as Complementary Color Components FIG. 27 is a diagram showing color separation for the G-K line, using ink of five colors of C, M, Y, K and G including particular color G ink. This color separation shows that the M ink and the K ink are used as complementary color components and inks of the pure color components are adjusted so that the G-K line is nearly linearly reproduced on the a* b* plane.

As shown in FIG. 27, the particular color G ink is reduced and the basic color C and the basic color Y are also reduced as in the case of the color separation in FIG. 22. However, the Y ink at the dark portion is used in a large amount for toning.

Figure 29:
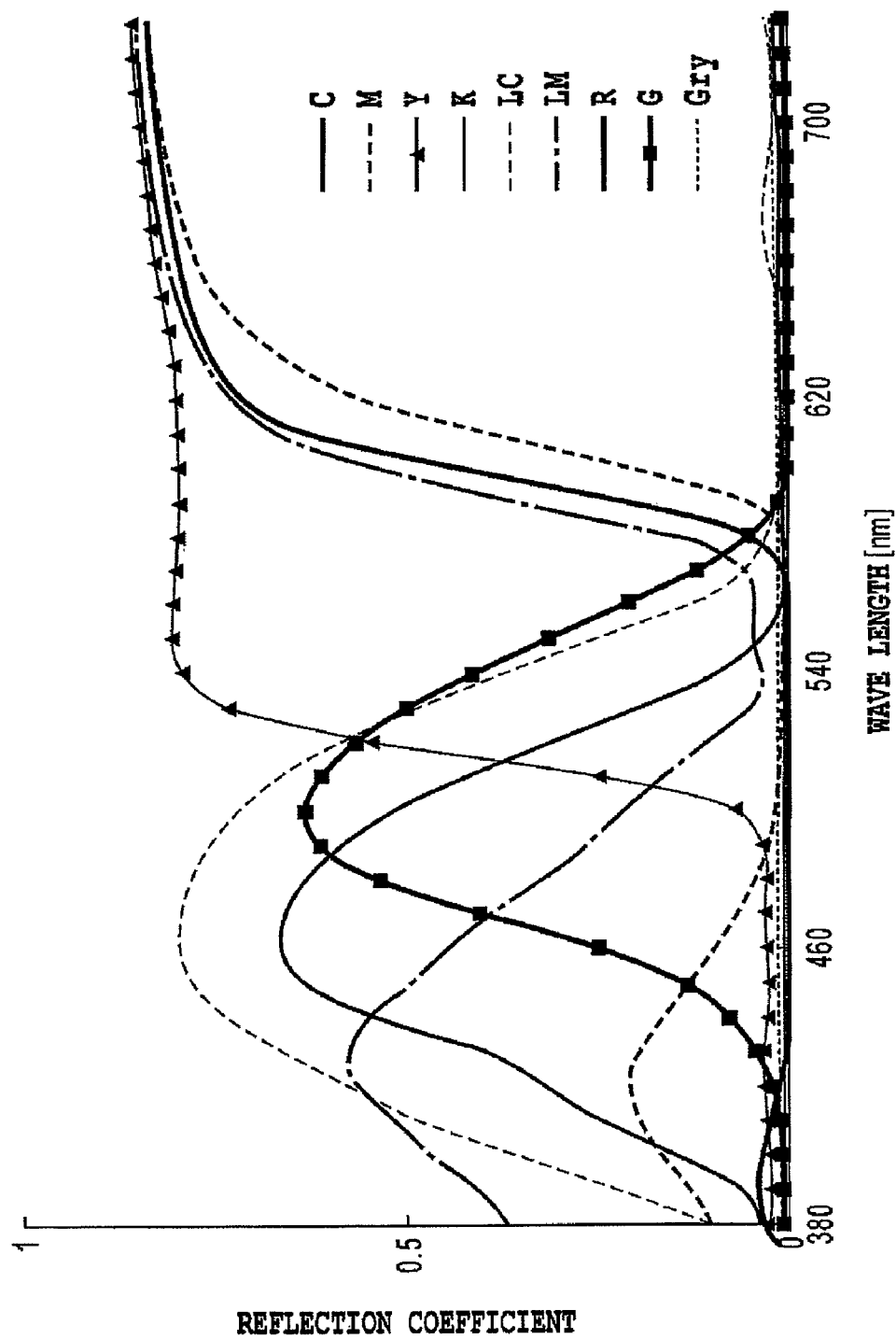
FIG. 29 is a diagram showing a coloring characteristic of each color of suitable pigment ink to which the present invention is effectively applied as a spectrum.

As in the case of the color separation in FIG. 29, as ink of the complementary color components, the M ink and the K ink are used. At a little distance point from the device secondary color G point, the M ink of the complementary color component is added. Thus the M ink is used for preventing the granular feeling, while lowering lightness and chroma at the same time, and the K ink starts to be used at a point where dots become unnoticeable even if the ink K is added. After that, the K ink monotonically increases to the device K.

The color reproduction by this color separation B3 becomes like a reproduction line b3 shown in FIG. 2. As seen from this figure, in the color separation B3, the color reproduction at the dark portion on the G-K line is made convex upwards and the chroma is not sufficient.

As described above, in the case of comparative examples using basic colors and quasi-basic colors as complementary color components, a sufficiently high chroma can not be achieved at the dark portion in the color reproduction region of a printer.

In contrast, the embodiment of the present invention uses the particular color R ink as a complementary color component for the device secondary color G, so as to realize high chroma at the dark portion in the color reproduction region of a printer.

Embodiment: Color Separation B4 in Which the Hue on the G-K Line is Adjusted to be the Same as Complementary Color Components in Comparative Examples 5, 6 and 7, and R and K Inks are Used as Complementary Color Components FIG. 28 is a diagram showing color separation according to an embodiment of the present invention for the G-K line shown in FIG. 18, using ink of five colors of C, Y, K, R and G including particular color G ink. This color separation uses the R ink and the K ink as complementary color components and further, inks of the pure color components are adjusted so that the G-K line is nearly linearly reproduced on the a* b* plane.

Figure 28:
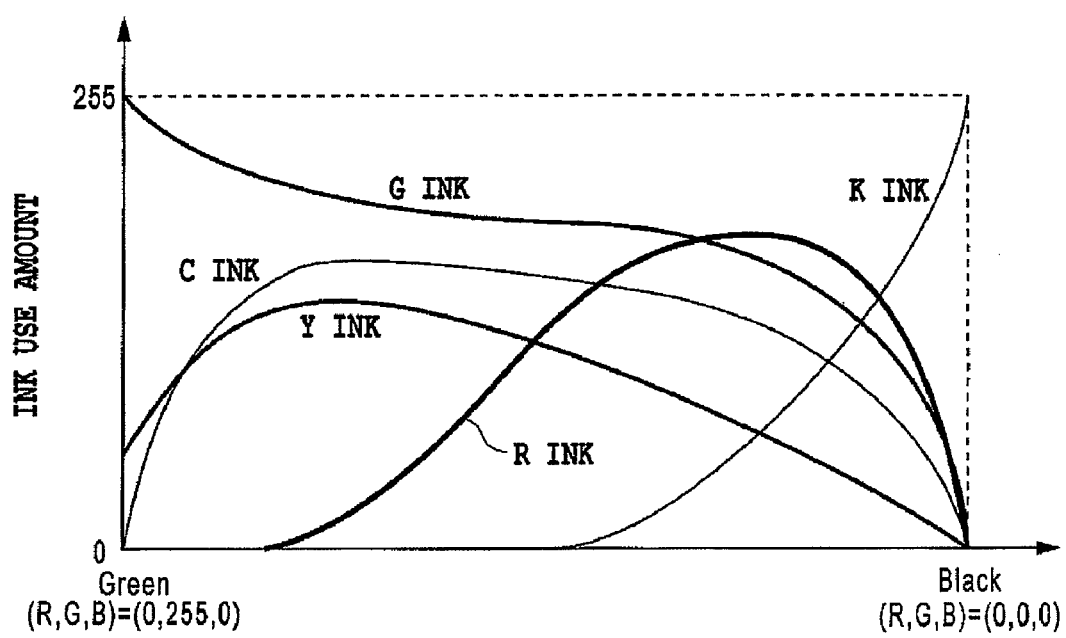
FIG. 28 is a diagram explaining color separation of a G-K line in a case of preparing a hue of a G-K line by using complementary color components as R and K, relating to an embodiment of the present invention.

As shown in FIG. 28, the device secondary color G-K is reproduced with ink of a pure color component formed by the color mixture of the particular color G ink and the basic color Y ink for toning this particular color G ink. Closer to the dark portion, the particular color G ink is less used. Along with it, the basic color C and Y inks are increased once. Thereafter, the basic color C and Y inks are reduced immediately before a device K point so as to lower the chroma and the lightness. Here, an ink amount of the basic color Y ink is reduced earlier than that of the basic color C ink. This is because of adjustment of the hue at the dark portion. It should be noted that in the present specification, "dark portion" means a region of colors having lower lightness than that of a color having the maximum chroma, in color changing such as the above Green to Black. In addition, in the low lightness side, a region of a color having relatively low lightness means "dark portion".

In the embodiment, the particular color R ink and the K ink are used as ink of the complementary color components. By thus using the particular color R ink as the complementary color component, as compared to a case of using M and K as the complementary color components in the color separation shown in FIG. 27 (comparative example 7), color adjustment by the Y ink of the pure color component becomes unnecessary. In addition, the complementary color M ink and the pure color Y ink for the color adjustment can be thus replaced by a single color of the particular color R only, thereby reducing a sum of the ink ejection amount.

A use amount of the particular color G ink with high chroma is lowered at a region of the line little distant from the device secondary color G point, and the reduced amount is replaced by the color mixture of the basic color C and Y inks, thereby lowering both the lightness and the chroma.

Then, the particular color R ink of the complementary color component begins to be added at a little distant point from the device secondary color G point. The R ink is thus used for preventing the granular feeling while lowering lightness and chroma at the same time, and the K ink starts to be used at a point where dots become unnoticeable even if the K ink is added. After that, the K ink monotonically increases to the device K.

The color reproduction by the color separation B4 according to the embodiment becomes like the reproduction line b4 in each of FIGS. 2 and 20. As seen from FIG. 20, the reproduction line b4 is formed as of a desired hue. Further, as seen from FIG. 2, the reproduction line b4 by this color separation B4 is nearly linear from the device secondary color G point to the device K and sufficient chroma can be obtained in the reproduction at the dark portion on the G-K line.

Coloring Mechanism in the Embodiment

First, pigment ink used as ink of the embodiment and the characteristics will be explained.

(Coloring Characteristic of Pigment Ink)

Dye ink is formed of color materials having a small particle diameter and is in a molten state in a solvent and has the properties of being easily permeated into a fiber inside of a paper. On the other hand, pigment ink is formed of color materials having a large particle diameter and is simply in a discrete state in a solvent and has the properties of being hard to be permeated into a fiber inside of a paper and being easily flocculated.

Since in coloring, the dyestuff is colored in a molecule state of a coloring matter or in a cluster state thereof, the number of the coloring matter in coloring increases, making it possible to perform coloring with high density. However, since the pigment is formed of particles, the number of the coloring matter in coloring is small and the coloring density is low. In addition, in the dyestuff, incident light is reflected on each color ink layer formed in an inside of the print medium, thereby contributing all of mixed ink for coloring. On the other hand, since in the pigment, incident light is almost all reflected on the ink layer at the most upward attached, the chroma has the tendency of being easily reduced in the case of the color mixture.

That is, in the dyestuff system, as colors are mixed, the absorption light region increases corresponding to an amount of the color mixture. On the other hand, in the pigment system, in an absorption light zone of first ink, in a case where second ink has a large reflection coefficient, light which is supposed to be absorbed essentially is reflected by the effect of the second ink, the spectrum by the color mixture has the tendency of being easily broad.

That is, the coloring characteristic of pigment has the feature that as compared to dyestuff, the chroma in a single color is lower, the chroma is easily reduced by the color mixture and further, the color adjustment effect by the color mixture is lower.

It should be noted that for the above reasons, as the other properties of the pigment, as compared to the dyestuff, weather-resistance (ozone proof, NOx proof and ultraviolet ray proof) and water resistance are excellent and on the other hand, long-term preservation stability and ejection stability are inferior.

(Composition of Pigment Ink)

An example of a pigment ink composition showing such coloring characteristic includes the following.

(Aqueous Medium)

Aqueous ink of the present invention includes a blended solvent of water and a soluble organic solvent. Examples of soluble organic solvents can selectively include the following. More specially, for example, it includes: alkyl alcohol of carbon numbers 1 to 4 such as methyl alcohol, ethyl alcohol, n-propyl alcohol, isopropyl alcohol, n-buthyl alcohol, sec-buthyl alcohol and tert-buthyl alcohol; amides such as dimethylforamide and dimethylacetoamide; ketone such as acetone and diaceton alcohol or ketone alcohol; ether such as tetrahydrofuran and dioxane; polyalkylene glycol such as polyethylene glycol and polypropylene glycol; alkylene glycol in which 2 to 6 carbon atoms are included in alkylene group such as ethylene glycol, propylene glycol, buthylene glycol, triethylene glycol, 1,2,6-hexane triol, thiodi glycol, hexylene glycol, diethylene glycol; lower alkyletheracetate such as polyethylene glycol monomethyletheracetate; glycerin; lower alkylether of multiple alcohol such as ethyleneglycolmonomethyl (or ethyl) ether, diethyleneglycolmethyl (or ethyl) ether and triethyleneglycolmonomethyl (or ethyl) ether; N-methyl-2-pyrrolidone, 2-pyrrolidone, and 1,3-dimethyl-2imidazolydinone. In addition an example of water preferably includes deionized water.

The content of a soluble organic solvent in the soluble ink of the present invention is not particularly limited and it is desired to preferably set the content within a range of 3 to 50% by mass to the total ink mass. In addition, it is preferable that an amount of water contained in the ink is within a range of 50 to 95% by mass to the total ink mass.

(Coloring Material)

Next, a coloring material of the present invention will be explained. A coloring material constituting aqueous ink of the present invention is not particularly limited as long as the coloring material can be used as aqueous ink. More specially the coloring material may include a soluble dyestuff containing an anionic group, a pigment of a resin dispersion type using a dispersant (resin dispersion type pigment), a pigment of a self-dispersion type introducing a hydrophile group on a surface of a pigment particle (self-dispersion type pigment), a pigment modified by chemically bonding an organic group containing polymer molecules on a surface of the pigment particle (resin bonding type self-dispersion pigment), and a pigment such as a micro capsule type pigment which can be dispersed by increasing dispersibility of an insoluble coloring material itself without use of a dispersant or the like. A ratio of a coloring material to a total ink amount is 0.1 to 15% by mass, more preferably 1 to 10% by mass. Hereinafter, the dyestuff and pigment which can be used in the present invention will be explained.

(Pigment)

The pigment which can be used in an aqueous ink of the present invention is not particularly limited and examples of the pigment may include any of the following.

A carbon black is suitable for a pigment used in black color ink. For example, the carbon black such as furnace black, lamp black, acetylene black and channel black can be used. More specially for example, examples of the carbon black can include Raven7000, Raven5750, Raven5250, Raven5000ULTRA, Raven3500, Raven2000, Raven1500, Raven1250, Raven1200, Raven1190ULTRA-II, Raven 1170, Raven1255 (the above made by Columbia Co.), Black Pearls L, Regal400R, Regal330R, Regal660R, Mogul L, Monarch700, Monarch800, Monarch880, Monarch900, Monarch1000, Monarch1100, Monarch1300, Monarch1400, Monarch2000, Valcan XC-72R (the above made by Cabot Co.), Color Black FW1, Color Black FW2, Color Black FW2V, Color Black FW18, Color Black FW200, Color Black S150, Color Black S160, Color Black S170, Printex35, Printex U, Printex V, Printex140U, Printex140V, Special Black6, Special black5, Special Black4A, Special black4 (the above made by Degssa Co.) and commercially available products such as No. 25, No. 33, No. 40, No. 47, No. 52, No. 900, No. 2300, MCF-88, MA600, MA7, MA8 and MA100 (the above made by Mitsubishi Chemistry Co.). In addition, a carbon black modified newly for the present invention may be used. However, the present invention is not limited to these, and may use a conventional known carbon black. In addition, the present invention is not limited to the carbon black, but may use a magnetic substance particle such as magnetite and ferrite or a black pigment such as titanium black.

More specially, examples of an organic pigment may include an insoluble azo pigment such as toluidine reds, toluidine maroons, hansa yellows, benzidine yellows and pyrazolone reds, a soluble azo pigment such as ritol reds, heliobordeaux, pigment scarlett, and permanent reds 2B, a derivative from an architecture dyestuff such as alizaline, indanthrone and thioindigo maroons, a phthalocyanine pigment such as phthalocyan blues and phthalocyan greens, a quinacridone pigment such as quinacridone reds and quinacridone magenta, perylene pigment such as perylene reds and perylene scarletts, an isoindolynone pigment such as isoindolynone yellows and isoindolynone oranges, an imidazole pigment such as benzimidazorone yellows, benzimidazorone oranges and benzimidazorone reds, a pylansron pigment such as pylansron reds and pylansron oranges, an indigoid pigment, a condensation azo pigment, a thioindigoid pigment, a diketopyrrolopyrrole pigment, flabansron yellows, acylamide yellows, quinophtharon yellows, nickel azo yellows, copper azomethylene yellows, perynon oranges, anthrone oranges, dianthrakynonele reds and dioxazine violets. Needless to say, the pigment is not limited to these, but may include other organic pigments.

When the organic pigments which may be used are shown in a color index number, for example, C.I pigment yellows are shown by 12, 13, 14, 17, 20, 24, 74, 83, 86, 93, 97, 109, 110, 117, 120, 125, 128, 137, 138, 147, 148, 150, 151, 153, 154, 166, 168, 180, 185, C.I. pigment oranges are shown by 16, 36, 43, 51, 55, 59, 61, 71, C.I. pigment reds are shown by 9, 48, 49, 52, 53, 57, 97, 122, 123, 149, 168, 175, 176, 177, 180, 192, 215, 216, 217, 220, 223, 224, 226, 227, 228, 238, 240, 254, 255, 272, C.I. pigment violets are shown by 19, 23, 29, 30, 37, 40, 50, C.I. pigment blues are shown by 15, 15:1, 15:3, 15:4, 15:6, 22, 60, 64, C.I. pigment greens are shown by 7, 36 and C.I. pigment browns are shown by 23, 25, and 26.

In addition, any of soluble resins may be used as a dispersant for dispersing a pigment into ink, but it is preferable that a dispersant has an averaging molecule weight in a range of 1000 to 30000, more preferably 3000 to 15000. Preferred examples of such dispersants include a block copolymer composed of at least two monomers (at least one of them is a hydrophile monomer) selected from including a styrene, a styrene derivative, a vinyl naphthalene, a vinyl naphthalene derivative and aliphatic alcohol ester of $\alpha$, $\beta$ ethylene unsaturated carboxylic acid acrylic acids, acrylic acid derivatives, maleic acids, maleic acid derivatives, itaconic acids, itaconic acid derivatives, fumaric acids, fumaric acid derivatives, acetic vinyl, vinylpyrrolidone, acrylamide, and the derivatives, or a random copolymer, a graft copolymer, or salt thereof. Or a natural resin such as rosin, shellac and amylum may be preferably used as the dispersant. These resins are soluble in an aqueous solution where a base is dissolved and alkali soluble resins. It should be noted that it is preferable that soluble resins used as the pigment dispersants are contained in a range of 1 to 5% by mass to the total ink mass.

(Other Component)

An aqueous ink in the present invention, for maintaining moisturing, may use a moisturizing solid content such as urea, urea derivative, trimechylolpropane and trimechylolethane as ink components in addition to the above components. In general, the content of the moisturizing solid content in the ink is preferably in a range of 0.1 to 20.0% by mass, more preferably 3.0 to 10.0% by mass.

In addition, ink for an ink jet printing apparatus of the present invention may contain various additives such as a ph adjuster, an antirust, an antiseptic, an antimold agent, an antioxidant, a reduction prevention agent and an evaporation accelerator as needed in addition to the above-mentioned components.

(Each Coloring of Pigment Inks)

FIG. 29 is a diagram showing a spectrum of coloring characteristic of each color pigment ink. Each ink of basic colors, quasi-basic colors and particular colors has the following spectrum characteristic.

Basic color C ink reflects light in short and medium wave length regions and absorbs light in a long wave length region.

Basic color M ink reflects light in short and long wave length regions and absorbs light in a medium wave length region. The reflection coefficient is higher in the long wave length region than in the vicinity of wave length 610 [nm], is slight in the vicinity of wave length 380 to 460 [nm] and is almost zero in a region of other wave lengths.

Basic color Y ink reflects light in medium and long wave length regions and absorbs light in a short wave length region.

Though quasi-basic color LC ink has the same spectrum as the basic color C ink, the quasi-basic color LC ink has a higher reflection coefficient to be bright in a region of all wave lengths.

Though quasi-basic color LM ink has the same spectrum as the basic color C ink, the quasi-basic color LM ink has a high reflection coefficient to be bright in a region of all wave lengths.

Particular color R ink reflects light in a long wave length region and absorbs light in short and medium wave length regions. The reflection coefficient is higher in the long wave length region than in the vicinity of wave length 600 [nm], and is almost zero in a region of other wave lengths.

Particular color G ink reflects light in a medium wave length region and absorbs light in short and long wave length regions. The particular color G ink has a spectrum shape such that it has a peak point in the vicinity of wave length 520 [nm] and a mountain shape in a range of wave length 400 to 600 [nm], and the reflection coefficient is almost zero in a region of other wave lengths.

Quasi-basic color K ink absorbs light in a region of all wave lengths.

Quasi-basic color Gry ink absorbs, not so much as the basic color K ink, light in a region of all wave lengths.

As described above, in a case of mixing the particular color G ink with the basic color M ink, slight reflection occurs in the range of wave length 380 to 960 [nm] and coloring has the tendency that the lightness is high and the chroma is low closer to blues. On the other hand, in a case of mixing the particular color G ink with the particular color R ink, the reflection does not occur in this range of the wave length, and the color reproduction with dark and high chroma is made while maintaining the hue of green.

Figure 30:
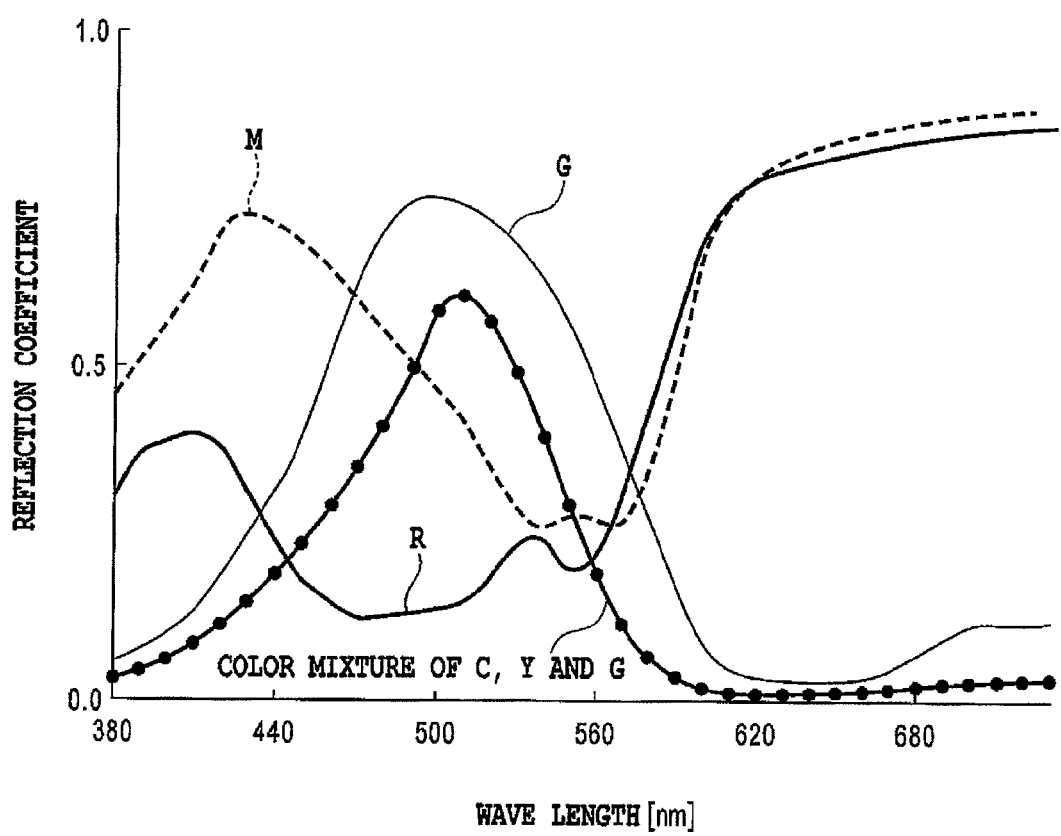
FIG. 30 is a diagram comparing a spectrum by color mixture print of a pure color component of color separation shown in FIG. 28, a spectrum of a single color of G, a spectrum of a single color of R, and a spectrum of a single color of M in color separation shown in FIG. 27.

FIG. 30 is a diagram showing a spectrum by the color mixture print of pure color components of C, Y, and G inks, a spectrum by particular color G ink and a spectrum by the complementary color component of R ink, in color separation B4 shown in FIG. 28. FIG. 30 also shows a spectrum of the complementary color component of M ink in color separation B3 shown in FIG. 27.

A spectrum by the color mixture print of each ink of the pure color components of C, Y and G is compared with a spectrum by the complementary color component of M ink. As shown in FIG. 30, the zone of greens as the color mixture is in the vicinity of wave length 520 [nm], and on the other hand, an absorption light zone of the complementary color component of M ink is wave length 560 [nm], and further, the reflection coefficient of the M ink is relatively large in the vicinity of wave length 480 [nm]. Accordingly, even if the M ink of the complementary color component is added to ink of the pure colors of C, Y and G, the lightness is not lowered because of a secondary reflection component of the M ink, and the spectrum is broad. It is estimated that high chroma can not be obtained at the dark portion.

On the other hand, when a spectrum by the color mixture print of the pure color components of C, Y and G is compared with a spectrum of the particular color R ink, the following is found out. As shown in FIG. 30, the zone of greens as the color mixture is in the vicinity of wave length 520 [nm], and on the other hand, an absorption light zone of the particular color R is substantially equal, and therefore, the particular color R is an idealized complementary color for the color mixture in terms of spectrum. Further, in the vicinity of wave length 480 [nm] where the secondary reflection of the M ink is generated, the particular color R maintains a relatively small reflection coefficient and has a little secondary reflection. Accordingly, when the particular color R ink is used as complementary colors for each ink of the pure colors of C, Y and G, the lightness is sufficiently lowered and also lowering of the chroma by the secondary reflection is not invited. Therefore, it is estimated that high chrome can be obtained at the dark portion.

Figure 31:
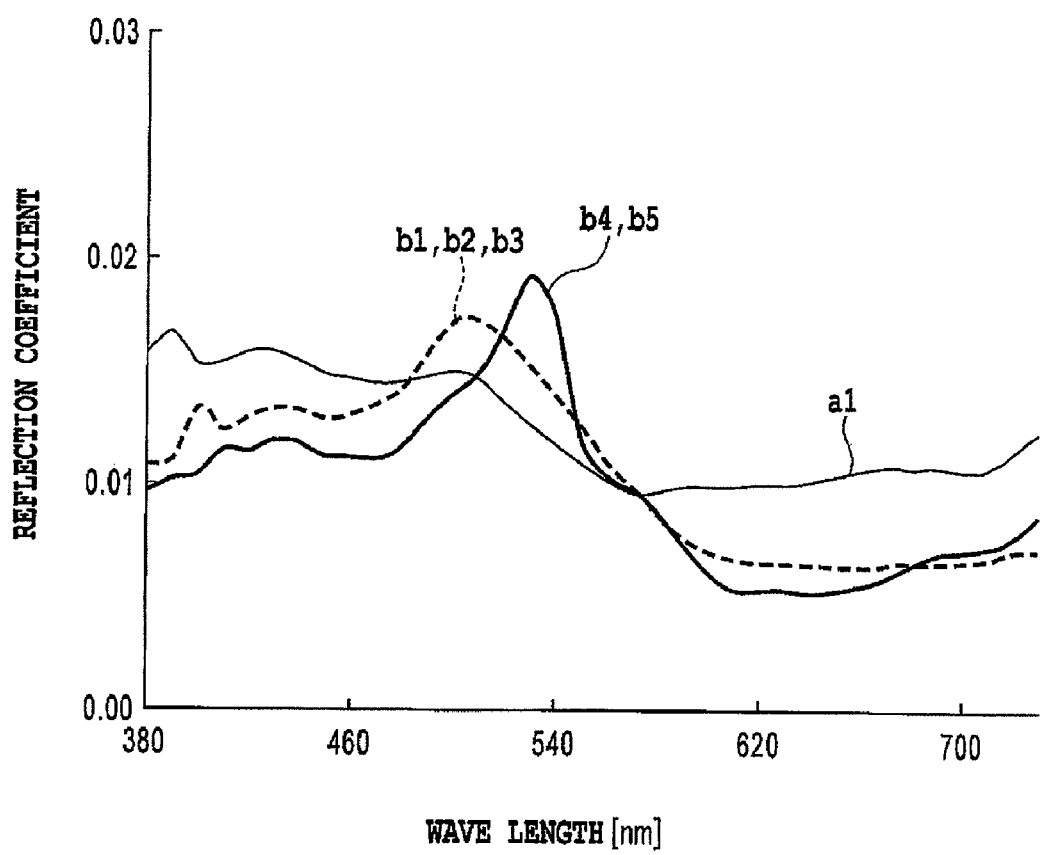
FIG. 31 is a diagram showing color reproduction at the dark portion in a case of performing the color separation in the conventional example and the present invention as a spectrum.

FIG. 31 is a diagram showing, as a spectrum, a reproduction line at the dark portion by each of the color separations A1 and B1 to B4. As seen from this figure, in a case of using particular color R ink as the complementary color component for the G-K line (cases of reproduction lines b4 and b5), the spectrum has a steeper peak at the dark portion than in a case of using basic colors or quasi-basic colors as the complementary color components (cases of reproduction lines b1, b2 and b3). With this, it is found out that in a case of using the particular color R ink as the complementary color component, the color reproduction with higher chroma can be realized.

(Modification 1)

A first modification of the embodiment is an example of color separation B5 of adjusting the hue on G-K line with the complementary color components of R, Gry and K.

Figure 32:
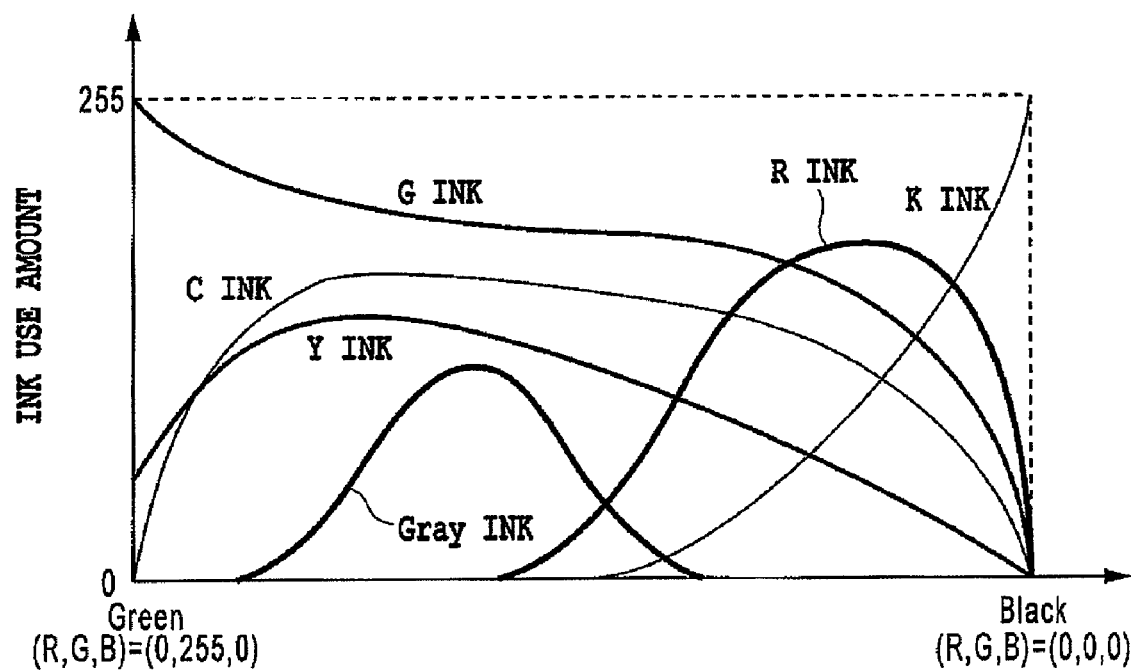
FIG. 32 is a diagram explaining color separation of a G-K line in a case of preparing a hue of the G-K line by using complementary color components as R, Gry and K, relating to a modification in the embodiment.

FIG. 32 is a diagram showing color separation for the G-K line in FIG. 18 according to a modification of the present invention, using ink of six colors of C, Y, K, R, G and Gry including the particular color G ink and using ink of complementary color components of Gry, R and K. This color separation shows an example that the G-K line is adjusted in such a manner as to be substantially linear on an a* b* plane.

The color separation B5 shown in FIG. 32 is basically the same as the color separation in the embodiment shown in FIG. 28. However, when Gry ink is used from the vicinity of the device secondary color G point and the particular color R ink begin to be added from a point where the granular feeling become unnoticeable as the complementary color component.

The above color separation may be used in a case where the granular feeling by the Gry ink is lower than that by the R ink, and then the granular feeling in the vicinity of the device secondary color G can be improved.

The color reproduction by the color separation B5 in the embodiment becomes like the reproduction line b5 in each of FIGS. 2 and 20. As seen from FIG. 20, the reproduction line b5 by this color reproduction B5 is formed as of a desired hue. Further, as seen from FIG. 2, the reproduction line b5 by this color separation B5 is substantially linear from the device secondary color G point to the device K and sufficient chroma can be obtained in the reproduction at the dark portion on the G-K line.

(Modification 2)

Figure 33:
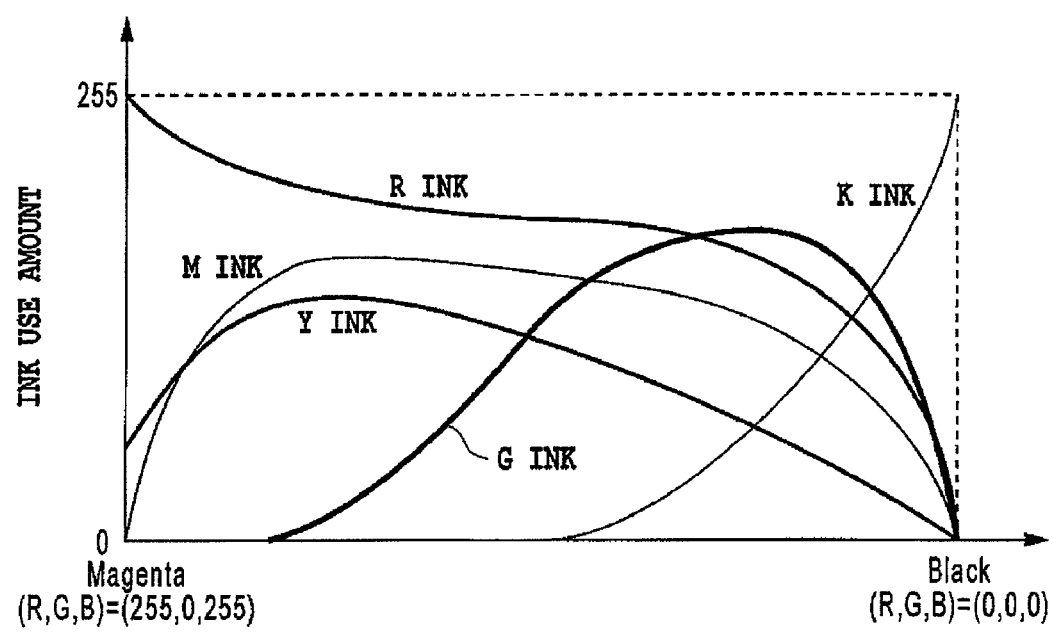
FIG. 33 is a diagram explaining color separation using a particular color G as a complementary color component in a R-K line, relating to a modification in the embodiment.

FIG. 33 is a diagram showing color separation in a second modification of the above embodiment. This color separation uses ink of five colors of M, Y, K, R, and G including the particular color R ink and uses inks of G and K as complementary color components for the color reproduction on R-K line in FIG. 18.

The color separation according to this modification, in which an object hue (line) is different, uses the particular color R ink as the pure color component and the particular color G ink as the complementary color component and is similar to the color separation shown in FIG. 28 in terms of a basic configuration.

The color separation method according to the present invention is applied to not only the G-K line but also can be broadened and applied to the other hue easily.

Examples of a combination of the particular color used for each of the pure color and the complementary color include G-R (O), R (O)-G as described above and further G-B (V), B (V)-G, R (O)-B (V), B (V)-R (O) or the like. Among the above combinations, there may be selected a combination where a pure color component and a particular color as a complementary color candidate are blended to obtain a desired hue and a high effect as the complementary color.

Other Embodiment

The embodiment and the modifications described above have explained the color separation where a method of reducing the specific ink and increasing the basic color C ink and the basic color Y ink is used as a basis of color separation on the G-K line in FIG. 18 and in addition to it, the other particular color ink is used as a complementary color component. However, an application of the present invention is not limited to such method. For example, in a method where the construction of the pure color component reproduces the device secondary color G-K with a single color of the particular color G ink, likewise the particular color can be effectively used. In addition, in a method of reproducing it with the particular color G ink and the basic color Y ink as the toning color component, and further, in a method of reproducing it with the particular color G ink and the basic color C as the toning color component, likewise the particular color can be effectively used.

In addition, the above example has explained a case where the quasi-basic color K is used at the device K point in a single form, but the device K point may be composed of not only the quasi-basic color K but also the color mixture by the other color. Or the quasi-basic color K may not be used at all. In addition, in such case, a method of using the particular color R at the device K point is also included in the scope of the present invention.

Further, a recent ink jet printer has demanded weather resistance even in a dyestuff system. Therefore, there is dyestuff to be easily flocculated, as dyestuff with high weather resistance. That is, in a case where the dyestuff is exposed to gases such as ozone and NOx or light such as ultraviolet rays and dyestuff molecules on the surface are destroyed, the internal molecules thereof survive. Since such dyestuff to be easily flocculated shows physical properties and coloring characteristics similar to those of the pigment exemplified by the above explanation, the color separation of the present invention can be effectively used to such dyestuff as in the case of the pigment.

In addition, in the embodiment and the modifications as described above, the color separation processing is executed by a host computer, but it is not limited to this without mentioning. For example, the color separation processing may be executed in a printing apparatus such as a printer or a multi-function machine having a printing function and further, other plural functions.

In addition, in the embodiment and the modifications as described above, the color separation processing is executed by using a table but it is not limited to this. For example, a conversion relation by a table may be executed by calculation.

Further Embodiment

The present invention is put into practice by executing program codes of software such as those shown in FIG. 17, for example, which are supplied to a computer in an apparatus or a system connected to various devices to operate these devices so as to implement the functions of the above described embodiments, so that the various devices are operated in accordance with the programs stored in the computer (CPU or MPU) of the system or apparatus. In this case, the program codes of the software themselves implement the functions of the above described embodiments, so that the program codes themselves and means for supplying them to the computer, for example, a storage medium storing such program codes constitute the present invention.

The storage medium storing such program codes may be, for example, a floppy disk, a hard disk, an optical disk, a magneto-optical disk, a CD-ROM, a magnetic tape, a non-volatile memory card, or a ROM.

In addition, if the functions of the above described embodiments are implemented not only by the computer by executing the supplied program codes but also through cooperation between the program codes and an OS (Operating System) running in the computer, another application software, or the like, then these program codes are of course embraced in the embodiments of the present invention.

Furthermore, a case is of course embraced in the present invention, where after the supplied program codes have been stored in a memory provided in an expanded board in the computer or an expanded unit connected to the computer, a CPU or the like provided in the expanded board or expanded unit executes part or all of the actual process based on instructions in the program codes, thereby implementing the functions of the above described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-148731, filed May 29, 2006, which is hereby incorporated by reference herein in its entirety.

What is claimed is:

1. An image processing apparatus comprising:
a processing unit and a memory which implement determining means for determining an amount of each of a recording material of green and a particular color recording material which express a color that is a complementary color to green and has a hue different from respective hues expressed by each of basic color recording materials corresponding to three primary colors, as recording materials used for color reproduction, so that, among colors to be reproduced by using the recording material of green, a color having a lightness lower than a lightness of a green having a maximum chroma is reproduced by using the recording material of green and the particular color recording material.

2. An image processing apparatus as claimed in claim 1, wherein the determining means executes a color separation process by using a table, and the table stores the respective amounts of the recording material of green and particular color recording materials, which express the color having lower lightness, as lattice point data corresponding to a lattice point defined with color signals specifying the color having lower lightness.

3. An image processing apparatus as claimed in claim 2, wherein the color having lower lightness is a color of a portion on a line that is formed by joining plural colors specified by the color signals.

4. An image processing apparatus as claimed in claim 1, wherein the determining means determines an amount of a basic color recording material so that the color having lower lightness is reproduced by using further the basic color recording material, a hue expressed by the basic color recording material is adjacent to a hue expressed by the recording material of green.

5. An image processing apparatus as claimed in claim 4, wherein, in reflection spectra of colors, a reflection coefficient of a color by the particular color recording material is lower than that of a color by color mixture of the recording material of green and the basic color recording material.

6. An image processing apparatus as claimed in claim 1, wherein the particular color recording material is a recording material of red.

7. An image processing apparatus as claimed in claim 1, wherein the determining means determines an amount of a recording material of a second particular color recording material in addition to determining amounts of the recording material of green and the particular color recording material to reproduce the color having the lower lightness than a lightness of a green having a maximum chroma.

8. An image processing apparatus as claimed in claim 7, wherein the second particular color recording material is a recording material of gray.

9. An image processing method comprising:
a determining step for determining an amount of each of a recording material of green and a particular color recording material which express a color that is a complementary color to green and has a hue different from respective hues expressed by each of basic color recording materials corresponding to three primary colors, as recording materials used for color reproduction, so that, among colors to be reproduced by using the recording material of green, a color having a lightness lower than lightness of a green having a maximum chroma is reproduced by using the recording material of green and the particular color recording material.

10. A non-transitory computer readable medium storing a program comprising program code means for performing the method of claim 9 when the program is run on a computer.

11. A printing apparatus that performs printing by using respective basic color recording materials corresponding to three primary colors and particular color recording materials which express different hues from respective hues expressed with the basic color recording materials, the basic color recording materials and the particular color recording materials being used for recording on a recording medium,
wherein in a case of reproducing at least one color on a color reproduction line which comprises a straight line and which extends from a color having a maximum chroma to a color of black and which is expressed with a recording material of green, a particular color recording material as well the recording material of green are used.

12. A printing apparatus as claimed in claim 11, wherein the particular color recording material is a recording material of red.

13. An image processing method, wherein the method determines an amount of a recording material used for recording on a recording medium so that at least one color on a straight line from green to black in a predetermined color space is reproduced by using a recording material of green and a recording material of red.

14. An image processing method, wherein the method determines an amount of a recording material used for recording on a recording medium so that a recording material of red is used as a complementary color when reproducing a color on a straight line from green to black in a predetermined color space.

15. A printing apparatus, wherein the apparatus is constructed to perform printing by using a recording material of green and a recording material of red to reproduce a color on a straight line from green to black in a predetermined color space, wherein the recording material of green and the recording material of red are used for recording on a recording medium.

16. A printing apparatus, wherein the apparatus is constructed to perform printing by using a recording material of red used for recording on a recording medium as a complementary color to reproduce a color on a straight line from green to black in a predetermined color space.

* * * * *